US012747773B2

(12) United States Patent
Graber et al.

(10) Patent No.: US 12,747,773 B2
(45) Date of Patent: Sep. 29, 2026

(54) VERTICAL CABLE RAILING ASSEMBLY

(71) Applicant: Digger Specialties, Inc., Bremen, IN (US)

(72) Inventors: Loren R. Graber, Nappanee, IN (US); Wendell J. Miller, Nappanee, IN (US)

(73) Assignee: Digger Specialties, Inc., Breman, IN (US)

(*) Notice: Subject to any disclaimer, the term of this patent is extended or adjusted under 35 U.S.C. 154(b) by 210 days.

(21) Appl. No.: 18/799,310

(22) Filed: Aug. 9, 2024

(65) Prior Publication Data

US 2024/0401669 A1 Dec. 5, 2024

Related U.S. Application Data

(63) Continuation of application No. 18/452,143, filed on Aug. 18, 2023, now Pat. No. 12,060,921, which is a continuation of application No. 17/716,021, filed on Apr. 8, 2022, now Pat. No. 11,732,776, which is a (Continued)

(51) Int. Cl.
*F16G 11/12* (2006.01)
*E04F 11/18* (2006.01)

(52) U.S. Cl.
CPC .......... *F16G 11/12* (2013.01); *E04F 11/1817* (2013.01); *E04F 11/1842* (2013.01); *E04F 11/1859* (2013.01); *E04F 2011/1819* (2013.01)

(58) Field of Classification Search
CPC ....... E04F 2011/1806; E04F 2011/1819; E04F 2011/1821; E04F 2011/1825; E04F 2011/1827; E04F 2011/1829; E04F 11/18; E04F 11/181; E04F 11/1812; E04F 11/1814; E04F 11/1842; E04F 11/1846; E04F 11/1859; F16G 11/12; E04H 17/14; E04H 17/1417; E04H 17/24
See application file for complete search history.

(56) References Cited

U.S. PATENT DOCUMENTS 802,773 A 10/1905 McGinn
2,343,672 A * 3/1944 Hyler ..................... F16G 11/12
24/115 K (Continued)

FOREIGN PATENT DOCUMENTS

AU 2006201442 B2 11/2006
AU 2013203403 B2 5/2013

(Continued)

*Primary Examiner* — Jonathan P Masinick
(74) *Attorney, Agent, or Firm* — Barnes & Thornburg LLP

(57) ABSTRACT

A railing system is provided that illustratively includes a first rail and a second rail where the first rail is spaced-apart from the second rail. At least one cable that extends between the spaced-apart first and second rails. The at least one cable includes a stop sleeve disposed about the cable and positioned adjacent an end of the at least one cable. A cable tensioner having a body, a bore disposed through the body, and a stop surface is located adjacent an opening in the cable tensioner. An adapter that includes a body and a bore that extends into the body. The body of the adapter forms a surface located in contact with an underside surface of the top panel of the second rail between the first and second sidewalls of the second rail.

18 Claims, 22 Drawing Sheets

Related U.S. Application Data continuation of application No. 16/561,243, filed on Sep. 5, 2019, now Pat. No. 11,300,180.

(60) Provisional application No. 62/727,763, filed on Sep. 6, 2018.

(56) References Cited

U.S. PATENT DOCUMENTS

| | | | | |
|---|---|---|---|---|
| 3,955,799 | A * | 5/1976 | Lauzier | E04F 11/1817 256/65.11 |
| 4,968,005 | A | 11/1990 | Zen | |
| 6,578,342 | B2 | 6/2003 | Faynor | |
| 6,679,480 | B1 * | 1/2004 | Hara | E04H 17/124 256/37 |
| 7,370,452 | B2 | 5/2008 | Rogers | |
| 7,628,386 | B2 | 12/2009 | Payne | |
| 7,889,075 | B2 * | 2/2011 | Winkler | G08B 13/122 340/541 |
| 8,052,346 | B2 | 11/2011 | Lin | |
| 8,814,145 | B2 | 8/2014 | Herman | |
| 9,249,577 | B2 * | 2/2016 | Ross | F16G 11/04 |
| 9,689,410 | B2 * | 6/2017 | Østervig | E04H 17/24 |
| 9,790,707 | B2 * | 10/2017 | Burt | E04F 11/1859 |
| 9,797,158 | B2 | 10/2017 | Springborn | |
| 9,976,320 | B2 * | 5/2018 | Burt | E04F 11/1859 |
| 11,230,843 | B2 * | 1/2022 | Kennedy | E04F 11/1859 |
| 2006/0151760 | A1 * | 7/2006 | Vyvyan-Vivian | B25B 25/00 254/231 |
| 2009/0050865 | A1 * | 2/2009 | Napier | E04F 11/1853 256/37 |
| 2009/0224222 | A1 | 9/2009 | Dezen et al. | |
| 2009/0321701 | A1 | 12/2009 | Payne | |
| 2010/0012910 | A1 * | 1/2010 | Napier | E04F 11/1859 256/34 |
| 2010/0219390 | A1 | 9/2010 | O'Banion et al. | |
| 2012/0168703 | A1 * | 7/2012 | Napier | E04F 11/1842 256/37 |
| 2014/0054530 | A1 | 2/2014 | Petta | |
| 2015/0204104 | A1 * | 7/2015 | Ostervig | E04F 11/1817 256/65.15 |
| 2015/0252570 | A1 | 9/2015 | Springborn | |
| 2016/0326768 | A1 * | 11/2016 | Schlatter | E04F 11/1859 |

FOREIGN PATENT DOCUMENTS

| | | | | |
|---|---|---|---|---|
| CH | 364348 | A | 9/1962 | |
| DE | 202005006597 | U1 | 6/2005 | |
| DE | 202007004616 | U1 | 6/2007 | |
| EP | 1653090 | A2 | 3/2006 | |
| JP | 3130263 | U | 3/2007 | |
| JP | 4744307 | B2 | 8/2007 | |
| JP | 3135453 | U | 9/2007 | |
| JP | 4823937 | B2 | 8/2008 | |
| JP | 5116741 | B2 | 1/2013 | |
| JP | 5279073 | B2 | 9/2013 | |
| KR | 200242616 | Y1 | 10/2001 | |
| KR | 100314119 | B1 | 11/2001 | |
| KR | 100635645 | B1 | 10/2006 | |
| KR | 100671248 | B1 | 1/2007 | |
| KR | 200450826 | Y1 | 11/2010 | |
| KR | 200460766 | Y1 | 3/2011 | |
| WO | 200795674 | A1 | 8/2007 | |
| WO | WO-2019100225 | A1 * | 5/2019 | F16G 11/12 |

* cited by examiner

VERTICAL CABLE RAILING ASSEMBLY

RELATED APPLICATIONS

The present Application is a Continuation Application of U.S. Continuation application Ser. No. 18/452,143, filed on Aug. 18, 2023 which is a Continuation Application of U.S. Continuation application Ser. No. 17/716,021, filed on Apr. 8, 2022 which is a Continuation Application of U.S. patent application Ser. No. 16/561,243, filed on Sep. 5, 2019, entitled, "Vertical Cable Railing Assembly," issued as U.S. Pat. No. 11,300,180, and is related to and claims priority to U.S. Provisional Patent Application, Ser. No. 62/727,763, filed on Sep. 6, 2018, entitled "Vertical Cable Railing System." The entire subject matter disclosed in these Applications is hereby expressly incorporated into the present Application.

TECHNICAL FIELD AND SUMMARY

The present disclosure relates to railings, fences, and like barriers, and, particularly, to the use of cable balusters employed in such railings, fences, and like barriers.

An illustrative embodiment of the present disclosure provides a railing system. The railing system comprises a horizontally-oriented upper rail and a horizontally-oriented lower rail. The horizontally-oriented upper rail is spaced-apart from the horizontally-oriented lower rail. The horizontally-oriented lower rail has an n-shaped cross-sectional profile that includes a first sidewall, a second sidewall spaced-apart and facing the first sidewall, and a top panel that extends between and connected to the first and second side walls. At least one cable extends between the spaced-apart horizontally-oriented upper and lower rails, and through an opening in the top panel and between the spaced-apart first and second sidewalls of the horizontally-oriented lower rail. The at least one cable includes a stop sleeve disposed about the cable and is positioned adjacent an end of the at least one cable. So, together, the stop sleeve and the at least one cable have a width greater than the at least one cable. A cable tensioner having a partially cylindrical body, a partially threaded outer surface, a bore disposed through the partially cylindrical body, and a stop surface located adjacent an opening on the cable tensioner. The at least one cable and the stop sleeve are located in the bore of the cable tensioner where the stop sleeve is engageable with the stop surface of the cable tensioner. An adapter that includes a body, a partially cylindrical bore that extends into the body, and first and second opposing flanges that extend outwardly from the body. At least a portion of the cable tensioner fits into the partially cylindrical bore of the adapter. A fastener having a threaded bore disposed therethrough and a contact surface adjacent the threaded bore. The partially threaded outer surface of the partially cylindrical body of the cable tensioner is threadingly engaged to the threaded bore of the fastener. The contact surface of the fastener engages the contact surface on the body of the adapter with a portion of the at least one cable, cable stop sleeve, and tensioner located within the partially cylindrical bore of the adapter. The first and second opposing flanges that extend outwardly from the body of the adapter form a surface located in contact with an underside surface of the top panel between the first and second side walls of the horizontally-oriented lower rail. Adjustment of the fastener allows the cable tensioner to selectively move towards and away from the underside surface of the top panel of the horizontally-oriented lower rail.

In the above and other embodiments, the railing system may further comprise: at least one rigid baluster extending between the horizontally-oriented upper rail and the horizontally-oriented lower rail, wherein the at least one baluster extends through a baluster opening disposed through the top panel of the horizontally-oriented lower rail, wherein each of the first and second sidewalls of the horizontally-oriented lower rail include a slot, wherein a panel is disposed in the slot and configured to receive an end of the at least one baluster to limit the spaced-apart distance between the horizontally-oriented upper rail and the horizontally-oriented lower rail; the first and second opposing flanges each include one radiused corner wherein the radiused corner of the first opposing flange is diagonally positioned with respect to the radiused corner of the second opposing flange; the partially cylindrical bore in the adapter includes at least one planar sidewall; the fastener being a nut; the baluster being wedged between the panel located in the horizontally-oriented lower rail and a second end of the baluster engaged with the horizontally-oriented upper rail; as the at least one baluster limits the spaced-apart distance between the horizontally-oriented upper rail and the horizontally-oriented lower rail, the at least one cable that extends between the spaced-apart horizontally-oriented upper and lower rails is tensioned by the cable tensioner selectively moved away from the underside surface of the top panel of the horizontally-oriented lower rail; the at least one cable is a plurality of cables, wherein each cable of the plurality of cables includes a stop sleeve disposed about the cable and positioned adjacent an end of the cable, so together the stop sleeve and the cable have a width greater than the cable, a cable tensioner having a partially cylindrical body, a partially threaded outer surface, a bore disposed through the partially cylindrical body, and a stop surface located adjacent an opening on the cable tensioner, wherein the cable and the stop sleeve are located in the bore of the cable tensioner where the stop sleeve is engageable with the stop surface of the cable tensioner; an adapter that includes a body, a partially cylindrical bore that extends into the body, and first and second opposing flanges that extend outwardly from the body, wherein at least a portion of the cable tensioner fits into the partially cylindrical bore of the adapter, and a fastener having a threaded bore disposed therethrough and a contact surface adjacent the threaded bore; the partially threaded outer surface of the partially cylindrical body of the cable tensioner for each cable of the plurality of cables is threadingly engaged to the threaded bore of the fastener, the contact surface of the fastener engages the contact surface on the body of the adapter with a portion of the cable, cable stop sleeve and tensioner located within the partially cylindrical bore of the adapter; the first and second opposing flanges that extend outwardly from the body of the adapter to form a surface located in contact with an underside surface of the top panel between the first and second sidewalls of the horizontally-oriented lower rail, and the adjustment of the fastener allows the cable tensioner to selectively move towards and away from the underside surface of the top panel of the horizontally-oriented lower rail; the horizontally-oriented upper rail includes a slot that faces the horizontally-oriented lower rail, wherein a longitudinally extending retainer plate engages the periphery of the slot, wherein the retainer plate includes an opening size to receive the at least one cable, but not a second stop sleeve located adjacent a second end of the cable, wherein the second end of the cable and stop sleeve are located within the horizontally-extending upper rail and engages the retainer plate, wherein a baluster opening is disposed of through the retainer plate and configured to receive a baluster having an end located within the horizontally-extending upper rail; and the plate fitted within each of the slots located on opposing sidewalls of the horizontally-extending lower rail, does not shroud the adapter located in the horizontally-extending lower rail.

Another illustrative embodiment of the present disclosure provides a railing system. The railing system comprises a first rail and a second rail where the first rail is spaced apart from the second rail. At least one cable that extends between the spaced-apart first and second rails, and extended through an opening in a top panel located between spaced-apart first and second sidewalls of the second rail. The at least one cable includes a stop sleeve disposed about the cable and positioned adjacent an end of the at least one cable. A cable tensioner having a body, a bore disposed through the body, and a stop surface located adjacent an opening in the cable tensioner. The at least one cable with its stop sleeve is located in the bore of the cable tensioner where the stop sleeve is engageable with the stop surface of the cable tensioner. An adapter that includes a body and a bore that extends into the body. At least a portion of the cable tensioner fits into the bore of the adapter. The body of the adapter forms a surface located in contact with an underside surface of the top panel of the second rail between the first and second sidewalls of the second rail.

In the above and other embodiments, the railing system may further comprise: a fastener having a threaded bore disposed therethrough and a contact surface adjacent the threaded bore, the partially threaded outer surface of the body of the cable tensioner threadedly engages the threaded bore of the fastener; the contact surface of the fastener engages a contact surface on the body of the adapter with a portion of the at least one cable, cable stop, and tensioner are located within the bore of the adapter; the adapter further includes first and second opposing flanges that extend outwardly from the body of the adapter and form a surface with the body located in contact with an underside surface of the top panel between the first and second sidewalls of the second rail; adjustment of the fastener allows the cable tensioner to selectively move towards and away from the underside surface of the top panel of the second rail.

Another illustrative embodiment of the present disclosure includes a method of assembling a rail system. The method comprises the steps of: providing a rail member that has a longitudinal extent, and a top panel located between spaced-apart first and second sidewalls that extend along the longitudinal extent of the rail member; extending a cable between the spaced-apart first and second sidewalls of the rail member; providing an adapter that includes a body and first and second opposing flanges that extend outwardly from the body of the adapter and form a surface; locating the adapter between the spaced-apart first and second sidewalls of the rail member; placing the adapter on an underside surface of the rail member between the spaced-apart first and second sidewalls; engaging the at least one cable with the adapter; and rotating the adapter so the first and second opposing flanges are located adjacent the spaced-apart first and second sidewalls, respectively.

In the above and other embodiments, the method of assembling a rail system may further comprise the steps of: providing each of the first and second opposing flanges of the adapter with one radiused corner such that the radiused corner of the first opposing flange is positioned diagonally with respect to the radiused corner of the second opposing flange; and rotating the adapter one-quarter turn so the first and second opposing flanges are located adjacent the spaced-apart first and second sidewalls, respectively.

Additional features and advantages of the vertical cable rail system will become apparent to those skilled in the art upon consideration of the following detailed descriptions of carrying out the vertical cable rail system as presently perceived.

BRIEF DESCRIPTION OF THE DRAWINGS

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels may be repeated among the figures to indicate corresponding or analogous elements.

Figure 1:
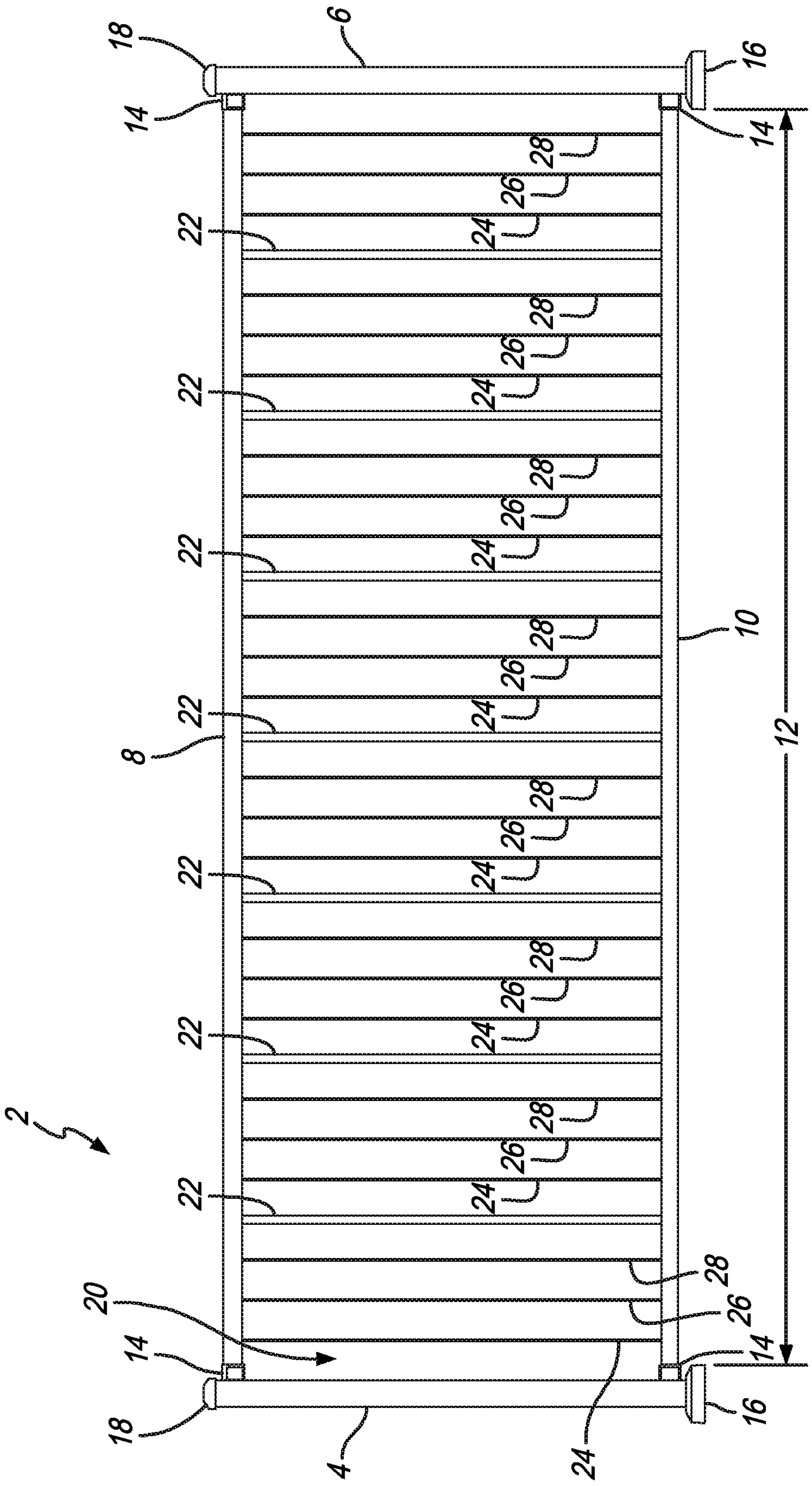
FIG. 1 is a front elevational view of a railing system according to an illustrative embodiment of the present disclosure.

Corresponding reference characters indicate corresponding parts throughout the several views. The exemplification set out herein illustrates embodiments of the vertical cable rail system, and such exemplification is not to be construed as limiting the scope of the vertical cable rail system in any manner.

DETAILED DESCRIPTION OF THE DRAWINGS

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

An illustrative embodiment of the present disclosure is directed to fencing or barriers (collectively referred to as railing systems) that employ tensioned cables to serve as physical barriers as an alternative to rigid only baluster railing systems.

Another illustrative embodiment of the present disclosure is directed to a railing system that employs a plurality of tensioned vertical cables that are spaced apart and extend between horizontally oriented upper and lower rails. Each of the plurality of cables extends from illustratively the underside of the top rail to the bottom rail, so as to serve as a baluster (i.e., physical barrier) for the railing system. Illustratively, each of the cables (which may be stainless steel, for example) extends through, either or both, upper and lower rails. For purposes of this disclosure, securement of the cable to the lower rail will be described further herein. It will be appreciated by the skilled artisan that such attachment systems, or substantial equivalents thereof, may be employed on the upper rail as well. In an illustrative embodiment, the cable may extend through the bottom rail. The cable extends into a channel formed in the lower rail. Within that channel, an adapter having an opening disposed therethrough, may receive a cable tensioner and a nut. Illustratively, a cable stop sleeve, located at or adjacent the end of the cable, may fit in a bore disposed through the cable tensioner. The cable tensioner may be illustratively configured by varying its opening size to hold the cable via a cable stop sleeve. The cable tensioner may fit in the adapter which abuts against a top surface of the channel that forms the bottom rail. In this configuration, the cable is extended through and held by the adapter and the cable tensioner is fitted against the upper surface of the bottom rail. The cable may be held in place and serve as a substitute for a conventional rigid post between upper and lower rails.

In an illustrative embodiment, the cable tensioner may include one or more keyed structures so as to prevent it from rotating with respect to the adapter. Such "keyed" structures may include one or more flat surfaces on an otherwise cylindrical body. Alternatively, the "keyed" structure may be a protrusion or detent. The cable tensioner may also have a portion of its outer surface threaded so as to engage and thread onto a nut. Illustratively, further threading the nut onto the cable tensioner (fitted in the adapter) will pull on the cable tensioner with respect to the adapter. This causes the cable, via the cable stop sleeve, to likewise be pulled with the cable tensioner. Because the other end of the cable is fixed to the upper rail, the cable tensioner, nut, and adapter cause the cable to be pulled taught or straight.

An illustrative embodiment of the adapter may include opposing wings to provide further support in the channel of the bottom rail. The wings may also aid in assembly of the rail system. Illustratively, the wings may include opposing square and rounded corners. This allows the adapter, during assembly, to be slid into the channel of the lower rail with its wing essentially coincident with or parallel to the longitudinal axis of the lower rail. Once the opening of the adapter is aligned with an opening that receives the cable in the upper surface of the lower rail, the adapter may be rotated (for example a quarter turn) to seat the adapter in its desired location within the lower rail. The radiused edge allows this pivoting within the channel of the lower rail, which during assembly, may provide added efficiency. The wing eases assembly in that each adaptor does not need to be meticulously placed onto the rail in order to prevent rotation. This allows the adaptor to move and seat past the interior side rib protrusions located in the interior of the lower rail without needing to be loaded from the end of rail. It also alleviates the need to end load both the adaptor and the aluminum bar in a specific sequence pattern of 3 adaptors/1 aluminum bar, and then line up the adaptor with each cable hole along the rail to place cables. During the cable tensioning process, the opposing square corners of the wings may abut the interior sides of the lower rail, thus limiting the adapter/tensioner rotation to one-quarter turn. This eliminates the need for a second tool/wrench to tension cables. Further, the adaptor being positioned perpendicular to the lower rail in the final tensioned assembly, positions it in a "no cut zone" on either side of the cable axis for railing sections otherwise needing to be cut down at the job site.

It is appreciated that in the illustrative embodiment there is an individual adaptor for each cable that extends through the lower rail. In other embodiments, the adapters may include a single web member with multiple tensioner-receiving openings to be inserted into the channel of the lower rail that have corresponding openings.

In a further embodiment, the bottom rail channel may include opposing slots located on the interior surface of the sides of the channel of the bottom rail. The opposing slots may be sized and dimensioned to receive a bar that can be slid along the channel of the bottom rail. The opposing slots may also be aligned with an opening that is sized and dimensioned to receive a support baluster that extends between the upper and bottom rails to assist providing structural support of the railing system. The bars are end loaded into the space in the lower rail and slid along the rail and placed intermittently in the lower rail while the cable assemblies are dropped into the cable holes. Once the cable assemblies are placed, the bar retains its position, lined up with the baluster hole, because of its length and placed between the interior side ribs. The length of the bar that slides into the slots formed on the inner walls of the lower rail may bump up against an adaptor on either side before it can slide out of position for the support baluster to engage the bar through the hole in the bottom rail.

An illustrated embodiment depicting a front elevational view of a railing system 2 is shown in FIG. 1. Railing system 2 is illustratively a section of railing. It is appreciated that multiple sections may be connected together as needed to create a full railing as determined by the size of the space to be closed in. The section of railing system 2 shown in FIG. 1 includes posts 4 and 6. Said posts 4 and 6 are illustratively vertically oriented extending from the ground or other surfaces, such as a patio, deck, yard, balcony, etc. Illustrative methods of attaching posts 4 and 6 to the ground or surface may include fasteners or concrete. Also, base 16 and cap 18 may be located on each post 4 and 6, as shown.

Located between posts 4 and 6 are upper rail 8 and lower rail 10. Upper and lower rails 8 and 10, respectively, help define the distance or run 12 between posts 4 and 6. Brackets 14 attach rails 8 and 10 to posts 4 and 6 as illustratively shown. It will be appreciated by the skilled artisan, upon reading this disclosure, that attaching rails 8 and 10 to the opposite sides of posts 4 and 6 may extend the length of railing system 2 to any desired length. As shown in this view, substantial space 20 exists between rails 8 and 10. In space 20 is located at least one (or a plurality) of support balusters 22. These support balusters 22 extend between railings 8 and 10 for supporting the railings and defining a distance between the railings. It is appreciated that any number of support balusters 22 may be used in a section of railing system 2 between posts 4 and 6. As shown in FIG. 1, illustratively, seven support balusters 22 may be used. That said, it is possible, depending on the length of run 12 between posts 4 and 6, that only one support balusters 22 is needed, or more than the seven support balusters 22 shown are needed. The skilled artisan will be able to determine upon reading this disclosure how many support balusters 22 may be employed based on desired use and configuration of the section of railing system 2. Support balusters may be made from metal, including, but not limited to, aluminum, iron, steel, wood, plastic, vinyl, or other like material.

Also extending between upper and lower railings 8 and 10, respectively, in space 20, are a plurality of cables 24, 26, and 28. It is appreciated that any number of cables from one to three to twenty-four to any other number may be employed in a section of railing system 2. The illustrative set of three cables 24, 26, and 28, located between support balusters 22 and posts 4 and 6, are not intended to define a specific number of such cables used between sections of railing system 2. It is further appreciated that the cables may be made of any variety of material including, but not limited to, stainless steel, other metal, nylon, fabric, or natural material. Illustratively, each of cables 24, 26, and 28 exert a tension force against rails 8 and 10, respectively. At the same time, support balusters 22 resists that tension force to maintain the space 20 between rails 8 and 10. The result is a strong railing system 2 with aesthetic uniqueness derived from the cables. In essence, cables 24, 26, and 28 act as balusters in similar fashion to conventional balusters to serve as a barrier in space 20 between rails 8 and 10.

Figure 2:
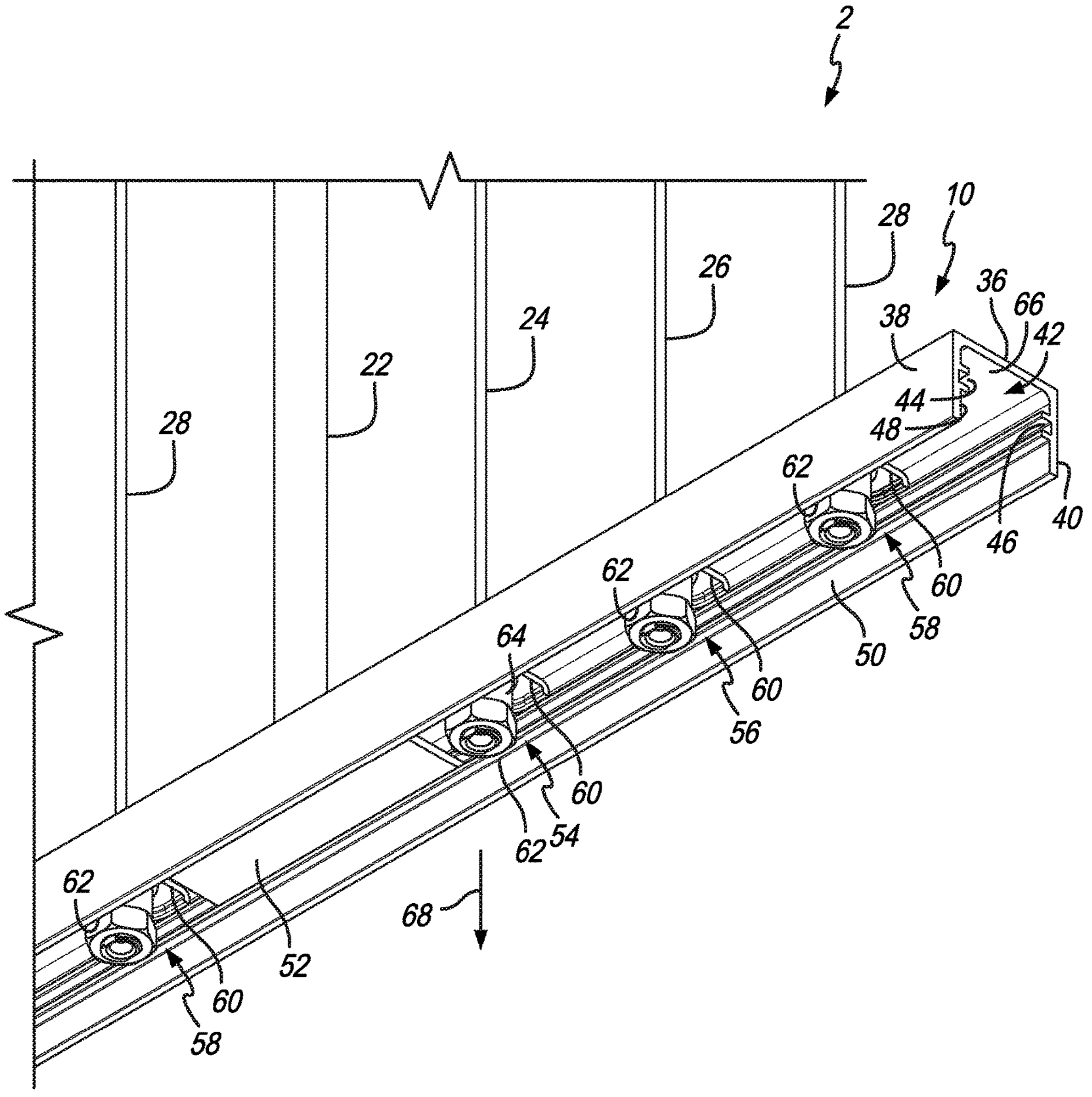
FIG. 2 is a perspective detail view of the underside of a portion of the railing system.

A perspective detail view of the underside of a portion of a section of railing system 2 is shown in FIG. 2. This view depicts how cables 24, 26, and 28 each attach to lower rail 10. Openings 30, 32, and 34, respectively (see FIG. 3), dispose through top panel 36 of lower rail 10. Sidewalls 38 and 40 of lower rail 10 are spaced apart from each other creating a space 42 illustratively within the underside of lower rail 10. It is appreciated that lower rail 10, as well as upper rail 8, may be made of an extruded aluminum, steel, iron, plastic, or other like materials suitable for railing construction. In the illustrated embodiment, each of sidewalls 38 and 40 include a slot 44 and 46, respectively, which extends along the longitudinal extent or run 12 on the inner surfaces 48 and 50, respectively, of sidewalls 38 and 40, respectively. Slots 44 and 46 are configured and sized to receive bar 52, as shown. Bar 52 supports support baluster 22 as further discussed with respect to FIGS. 4 and 6.

To secure each of cables 24, 26, and 28 to lower rail 10, each includes a securement assemblies 54, 56, and 58. It is appreciated that, again, although the description herein is referring to an illustrative trio of cables extending into lower rail 10, one skilled in the art will understand that any number of cables may extend into lower rail 10, including, but not limited to, just one cable. In other words, this disclosure should not be interpreted as requiring the illustrated number of cable balusters shown. Each securement assembly 54, 56, and 58 includes an adapter and a nut 62 as further disclosed herein (see, also, FIGS. 4, 5, and 11). Cable 24 extends through adapter 60 and secures to nut 62. Body 64 of adapter 60 receives cable 24 and provides a rigid spacing between nut 62 and inner surface 66 of top panel 36. Nut 62 engages cable 24 as further described herein to provide axial tension of cable 24 in direction 68. Accordingly, nut 62, being able to further draw cable 24 in direction 68, produces further tension on cable 24. This ensures cable 24 is taught while extending between upper rail 8 and lower rail 10 so cable 24 may serve as a baluster.

Figure 3:
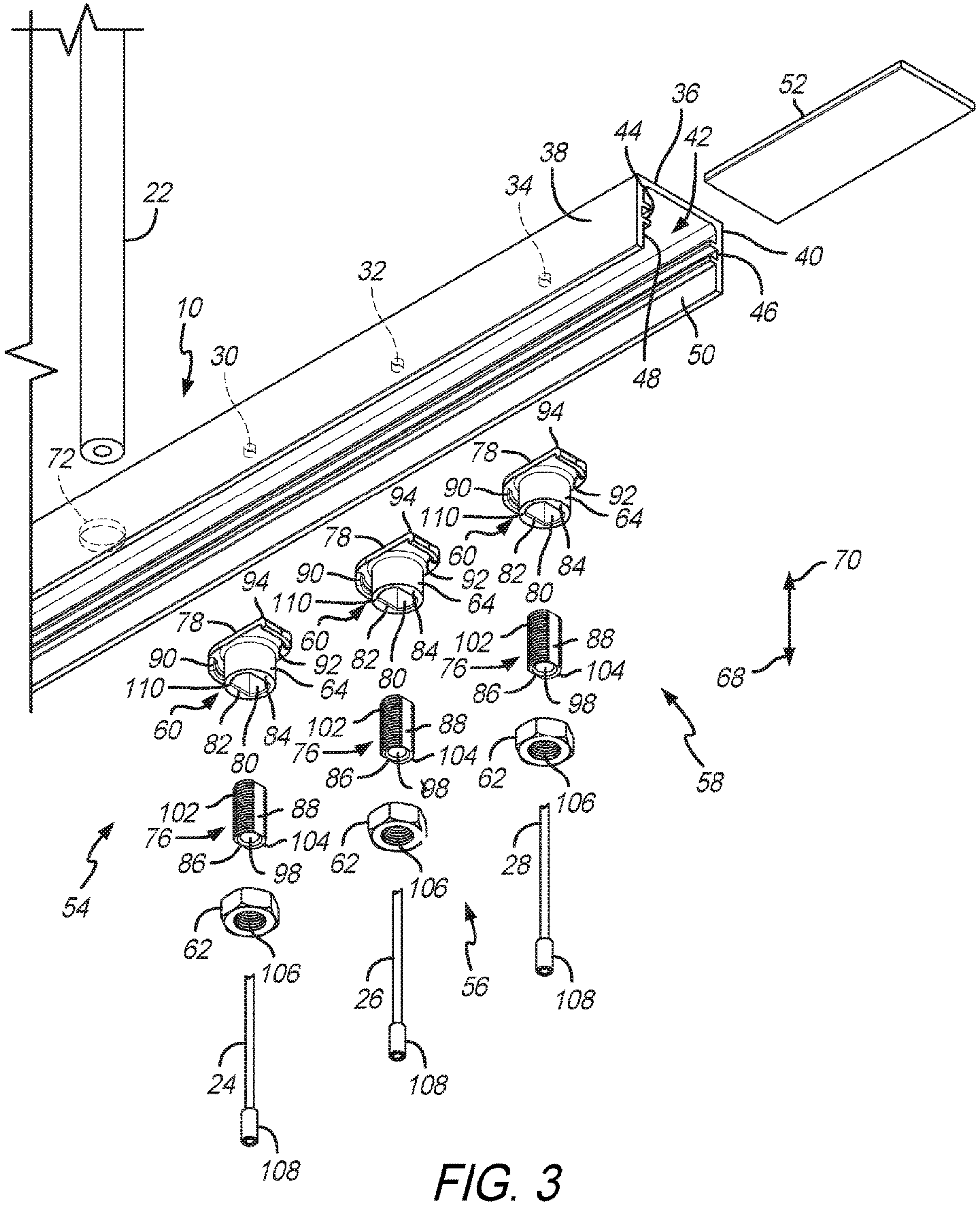
FIG. 3 is an exploded detail perspective view of a portion of a section of the railing system.

An exploded detail perspective view of a portion of a section of railing system 2 is shown in FIG. 3. From this view, support baluster 22 is configured to extend through opening 72, which is disposed through top panel 36 of lower rail 10. Plate or bar 52 is sized to fit into slots 44 and 46 on inner surfaces 48 and 50 of sidewalls 38 and 40, respectively. Bar 52 may illustratively slide along the longitudinal extent or run of lower rail 10 until it is seated underneath opening 72. In this way, support baluster 22 may engage bar 52 once extended through opening 72. This configuration, along with support baluster 22 engaging top rail 8 (see, also, FIG. 4), establishes a spacing 20 that can be maintained between upper rail 8 and lower rail 10. This allows cables 24, 26, and 28 to be tensioned between upper rail 8 and lower rail 10 to serve as effective balusters.

Also shown in this view are securement assemblies 54, 56, and 58. Each is configured to receive and secure one of cables 24, 26, and 28, which are disposed through openings 30, 32, and 34, respectively. Each of securement assemblies 54, 56, and 58, includes adapter 60, nut 62, and a cable tensioner 76.

Adapter 60 illustratively includes a wing portion 78 and body 64. It is appreciated that adapter 60 may be made of nylon, plastic, metal, or other like material. Body 64, of adapter 60, includes a bore 80 disposed therethrough, as well as through wing 78 sized and configured to receive cable tensioner 76. In the illustrative embodiment, bore 80 may be fully or only partially cylindrical. In this illustrated embodiment, bore 80 includes linear walls 82 and 84 which correspond to linear walls 86 and 88 on cable tensioner 76. This is so cable tensioner 76 does not rotate about its longitudinal axis while still movable in direction 68 or 70 within bore 80 of adapter 60 (see, also, FIG. 5). Adapter 60 also includes wing portion 78 extending illustratively transverse to the longitudinal extent of bore 80. Wing portion 78, as also shown in FIGS. 8A, 8B, 8C, and 8D, includes opposed radius corners 90 and 92, as well as diagonally opposed square corners 94 and 96. This allows adapter 60 to be fitted into space 42 within lower rail 10, with wing portion 78 aligned with the longitudinal extent or run 12 of lower rail 10, wing portion 8 may then be rotated illustratively a quarter turn, as further discussed in FIGS. 12-14. These positions of wing portion 78 are, thus, oriented transverse to the longitudinal extent or run 12 of lower rail 10. When this is done, such that bore 80 is aligned with opening 30, adapter 60 is secured or may be secured within lower rail 10 to be held in place sufficient to finish assembling securement assembly 54. To that end, cable tensioner 76 is configured to fit into bore 80 of adapter 60. A cable bore 98 is disposed through cable tensioner 76, and is intended to align with opening 30 in lower rail 10.

Linear walls 86 and 88 correspond to walls 82 and 84 that are part of bore 80 in adapter 60. This configuration is such that cable tensioner 76 does not rotate with respect to adapter 60. Illustratively, cable tensioner 76 includes threaded surfaces 102 and 104 that illustratively correspond with a threaded surface of bore 106 in nut 62. As further discussed with respect to FIG. 5, cable tensioner 76 engages cable stop sleeves 108. It is appreciated that cable stop sleeves 108 may be made of stainless steel, or other material that can withstand the force that applies tension onto cable 24. In the illustrated embodiment, nut 62 sits on end surface 110 of body 64 of adapter 60. By rotating nut 62, corresponding threads in bore 106 engage and travel along threaded surfaces 102 and 104 which cause cable tensioner 76 to move in either direction 68 or 70 as needed to apply the appropriate tension onto cable 24. For example, rotating nut 62 in a first direction may cause cable tensioner 76 to move in direction 68, which will cause tension to be applied to cable 24. Conversely, rotating nut 62 in the opposite direction will cause cable tensioner 76 to move within bore 80 of adapter 60 to move in direction 70, which will lessen tension on cable 24. It is further appreciated that these same structures exist for securement assemblies 56 and 58 as shown in FIG. 3.

Figure 4:
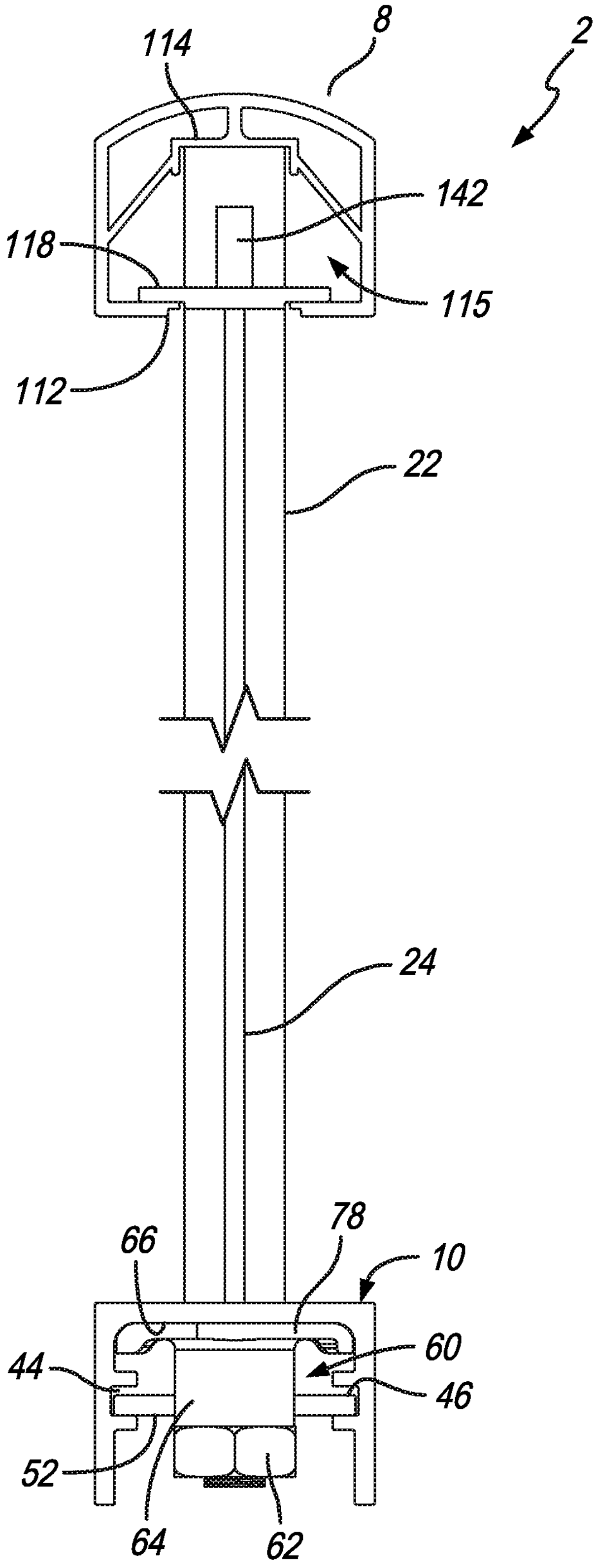
FIG. 4 is an end across-sectional view of the railing system.

An end cross-sectional view of railing system 2 is shown in FIG. 4. This view, in particular, depicts support baluster 22 disposed through opening 112 in communication with cavity 115 of upper rail 8. A support cap 114 is located within upper rail 8. As shown, and consistent with the other views, support baluster 22 extends from upper rail 8 through lower rail 10 and supported by bar 52 located in slots 44 and 46, as illustratively shown. The skilled artisan, upon reading this disclosure, may therefore appreciate how the combination of balusters 22, with upper and lower rails 8 and 10, respectively, serve to establish a fixed distance between upper rail 8 and lower rail 10. This fixed distance allows cable 24 (as well as the other cables 26 and 28, for example) to extend through both upper and lower rails 8 and 10, respectively. This view also shows how wing portion 78, of adapter 60, abuts inner surface 66 of lower rail 10. Illustratively, wing portion 78 may have a curved edge that conforms to the curved edge at the sides of inner surface 66 as shown in FIG. 4. It is further appreciated from this view that, with adapter 60 abutting interior surface 66 of lower rail 10 and nut 62 seated on body 64, cable 24 extended therethrough may be secured in tension between upper and lower rails 8 and 10, respectively. A longitudinally extending retainer 118 or other structure secures the top of cable 24 inside upper rail 8.

Figure 5:
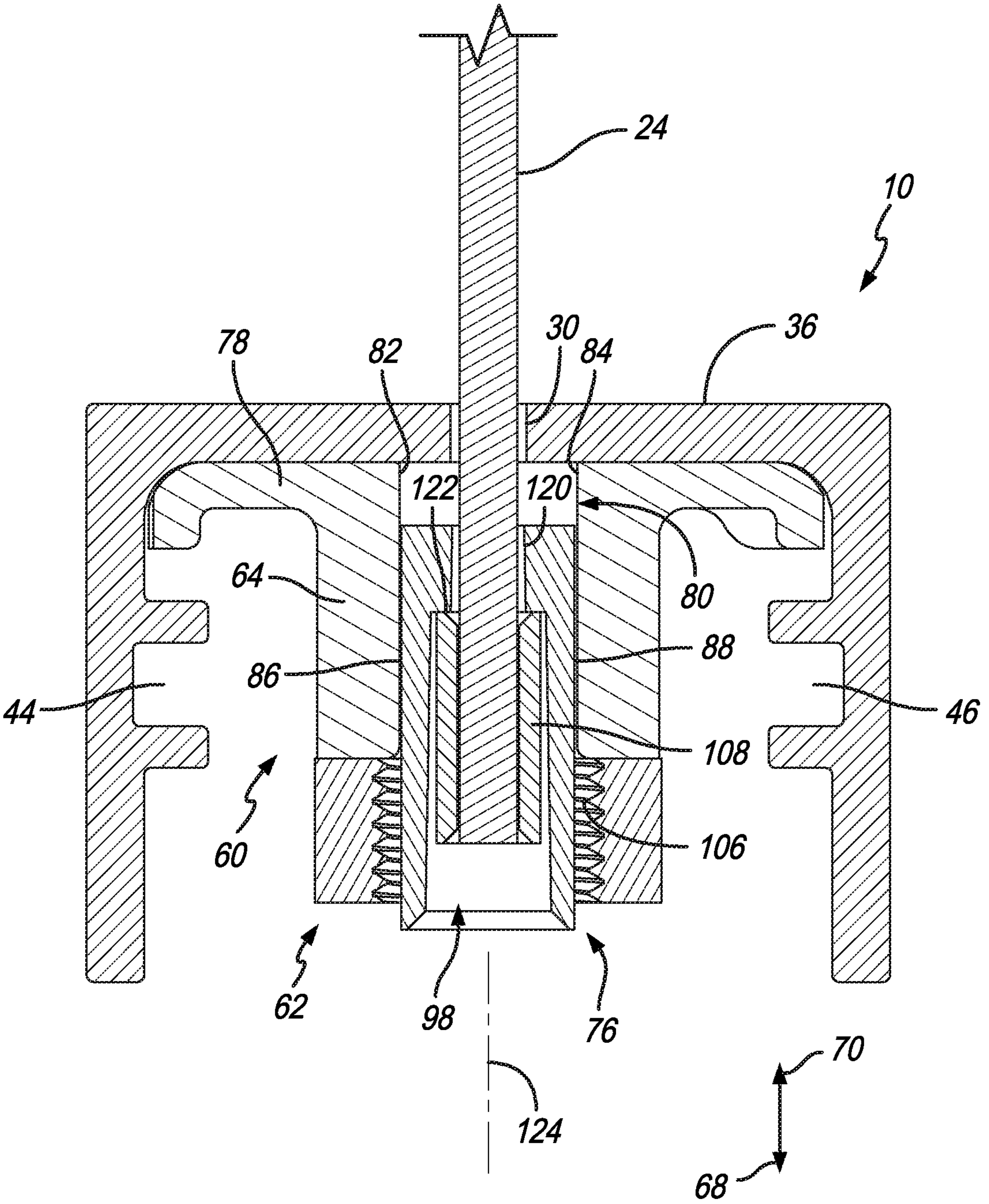
FIG. 5 is a detail cross-sectional view of the lower rail of the railing system.

A detail cross-sectional end view of lower rail 10 of railing system 2 is shown in FIG. 5. This view shows the interior of both adapter 60 and nut 62 within lower rail 10 to demonstrate how cable 24 may be tensioned. Also shown in this view is the interior of cable tensioner 76. Particularly, cable 24 is shown disposed through opening 30 on top panel 36 of lower rail 10. Cable 24 further extends through bore 80 disposed through both wing 78 and body 64 of adapter 60. Still further, cable 24 extends through opening 120, cable tensioner 76, and cable bore 98 as shown. Cable stop sleeves 108, fitted and secured about cable 24, as shown, is configured to engage stop surface 122 located inside cable bore 98. This means that cable 24 can be moved in vertical directions 68 and 70 by moving cable tensioner 76 in either direction 68 or 70 within bore 80 of adapter 60. This view shows linear walls 86 and 88 on cable tensioner 76 that correspond to linear walls 82 and 84 that are part of bore 80 of adapter 60. These linear walls are configured so that table tensioner 76 does not rotate about axis 124 as shown therein. This allows threaded surfaces in bore 106 to engage threaded surfaces 102 and 104 (see FIG. 3) of cable tensioner 76 which creates the selective linear movement in either direction 68 or 70. As previously stated, rotating nut 62 about axis 124 in a first direction will draw cable tensioner 76 (via engagement between the threads translating rotational movement to linear movement) in direction 68. Stop surface 122 will move cable stop sleeves 108 and, thereby, cable 24 in direction 68 as well. This, as shown, creates tension on cable 24 which assists allowing cable 24 to serve as a baluster in space 20 between upper and lower rails 8 and 10, respectively, as shown in FIG. 1. Conversely rotating nut 62 in the opposite direction will move cable tensioner 76 in direction 70 which relieves the drawing force between stop surface 122 and cable stop sleeves 108, thereby relieving the tension and possibly allowing movement of cable 24 in direction 70.

Figure 6:
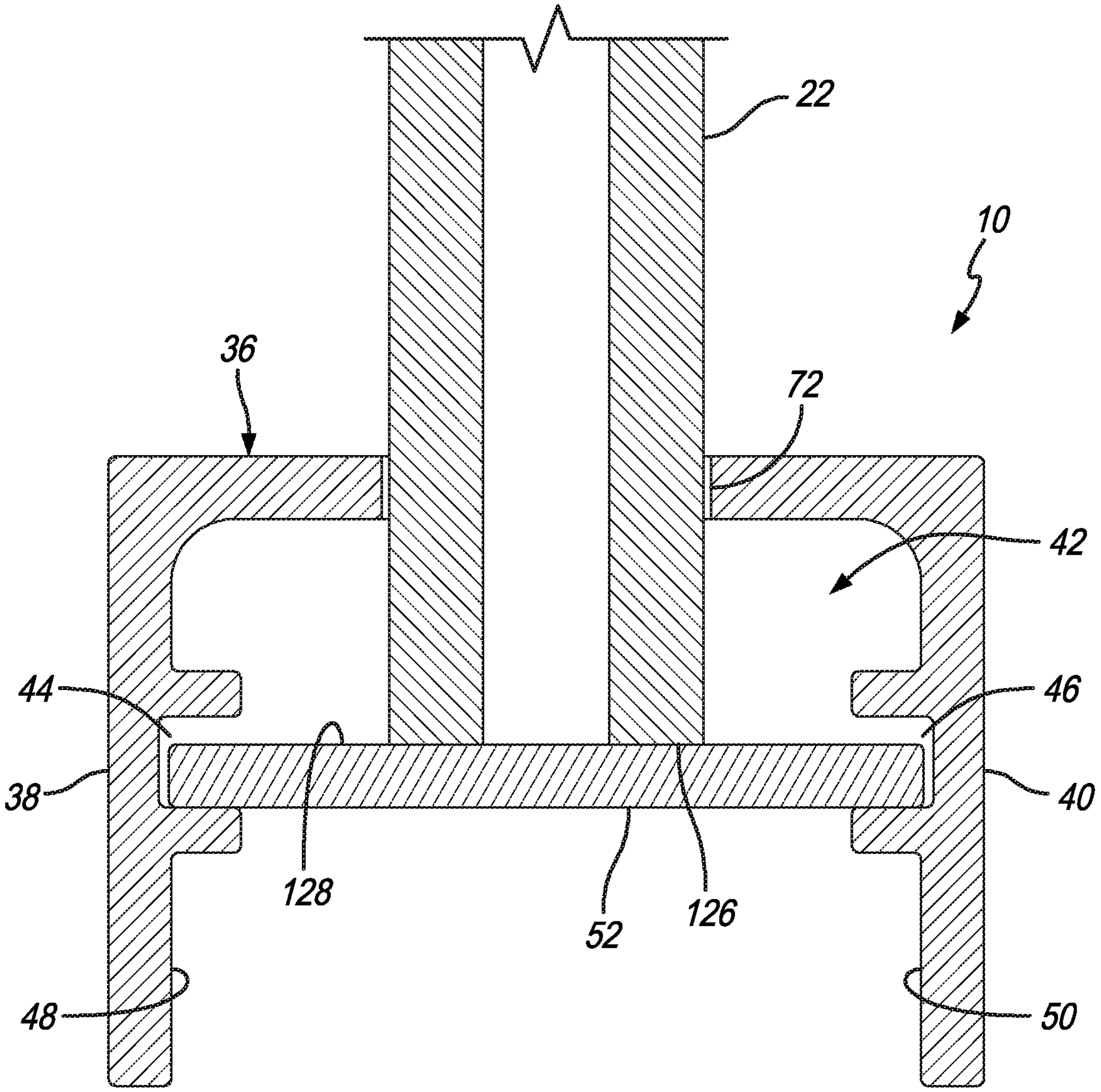
FIG. 6 is an end across-sectional detail view of a portion of the lower rail.

An end cross-sectional detail view of a portion of lower rail 10 is shown in FIG. 6. This view is similar to the view in FIG. 5 except that it shows how support baluster 22 engages bar 52 within space 42 of rail 10. As shown, end surface 126 of support baluster 22, disposed through opening 72 and top panel 36 of lower rail 10, engages top surface 128 of bar 52. Support cap 114 in upper rail 8 (see, also, FIG. 4) provides a support structure for the upper end of support baluster 22. This view also shows how bar 52 is fitted into slots 44 and 46 extending from surfaces 48 and 50 of sidewalls 38 and 40 of lower rail 10.

Figure 7:
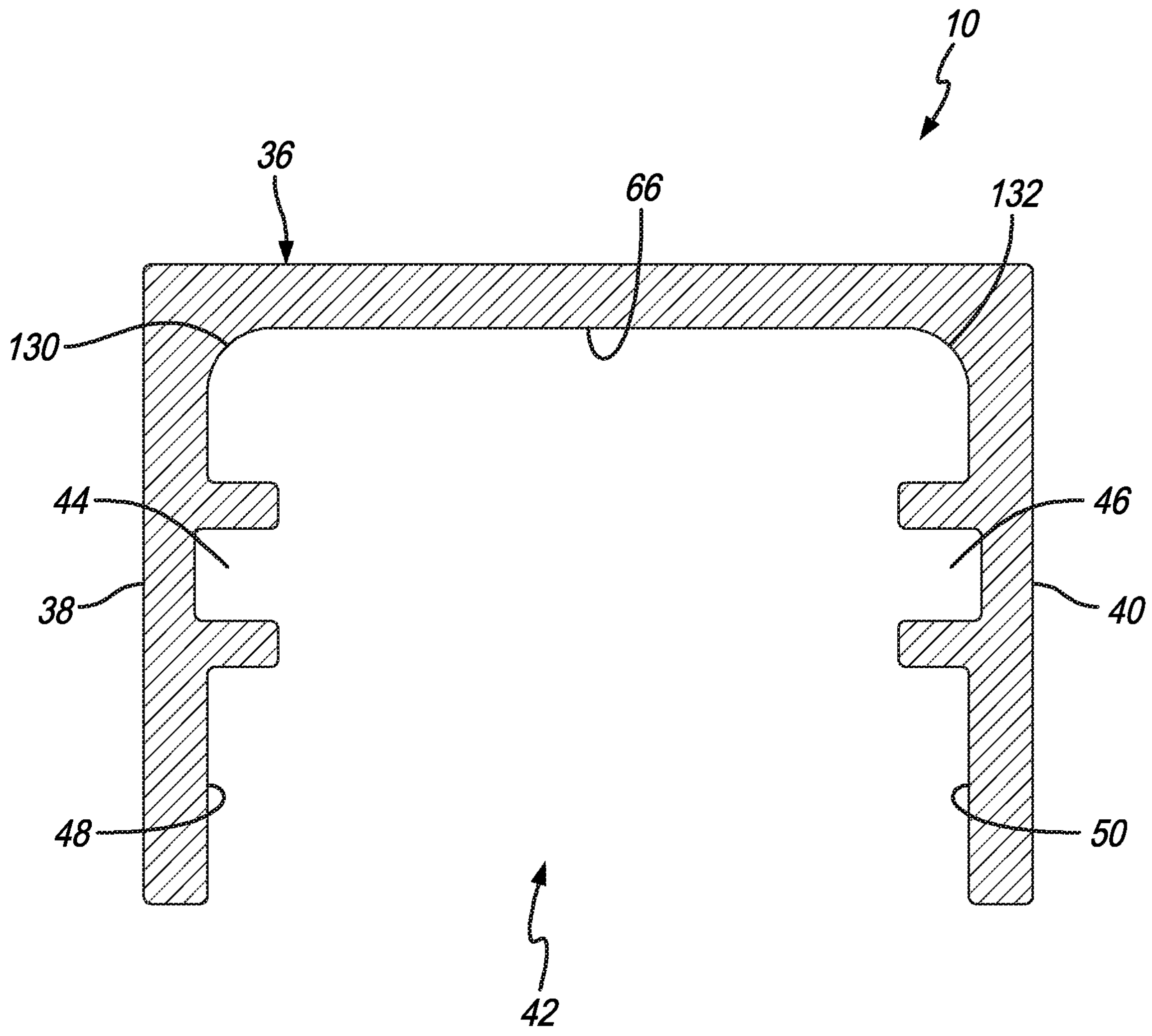
FIG. 7 is a view of the lower rail.

An end view of lower rail 10 is shown in FIG. 7. This view depicts top panel 36, inner surface 66, and sidewalls 38 and 40. It is appreciated that inner surface 66 may have curved ends such as those shown by reference numerals 130 and 132 that may be complimentary to corresponding ends of adapter 60 (see, also, FIG. 5). Also shown in this view are opposed slots 44 and 46 extending from inner surfaces 48 and 50 of sidewalls 38 and 40, respectively. It is appreciated that lower rail 10 may be made of aluminum, iron, polymer, or other like material. In addition, such lower rail 10 may be formed by extruding same through a die to obtain the cross-section profile of the type shown in FIG. 7.

Various views of adapter 60 are shown in FIGS. 8A, 8B, 8C, and 8D. The perspective view of adapter 60 shown in FIG. 8A helps further illustrate bore 80 disposed through both wing 78 and body portion 64. As previously discussed, bore 80 may align with one of the openings disposed through top panel 36 of lower rail 10 to allow a cable to extend therein. This view also shows radiused corners 90 and 92. Having such curved corners allows adapter 60 to be rotated within space 42 of lower rail 10 in order to assist seating adapter 60 in an appropriate position underneath one of the openings (e.g., 30, 32, or 34) disposed through top panel 36 of lower rail 10. Corners 94 and 96 on wing 78 serve to limit rotation of adapter 60 inside lower rail 10 to a certain extent, illustratively, to about a one quarter turn.

Figure 8A:
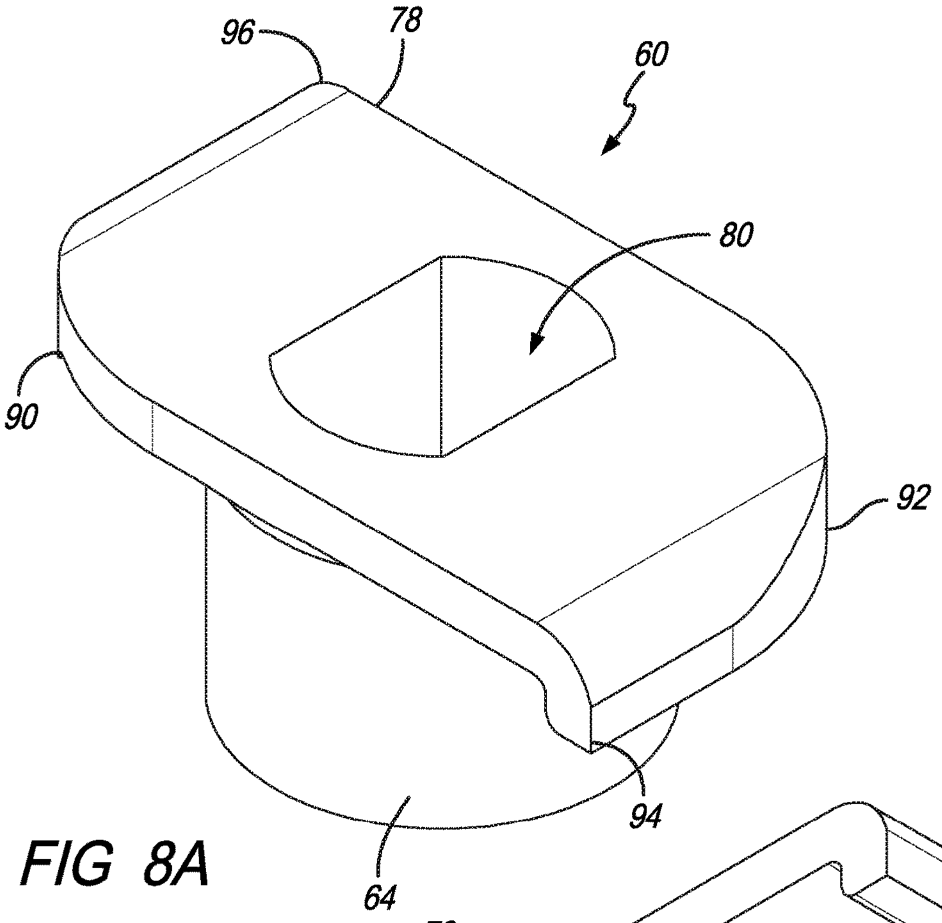
FIGS. 8A, 8B, 8C, and 8D are top perspective, underside perspective, underside, and side elevational views, respectively, of an adapter.
Figure 8B:
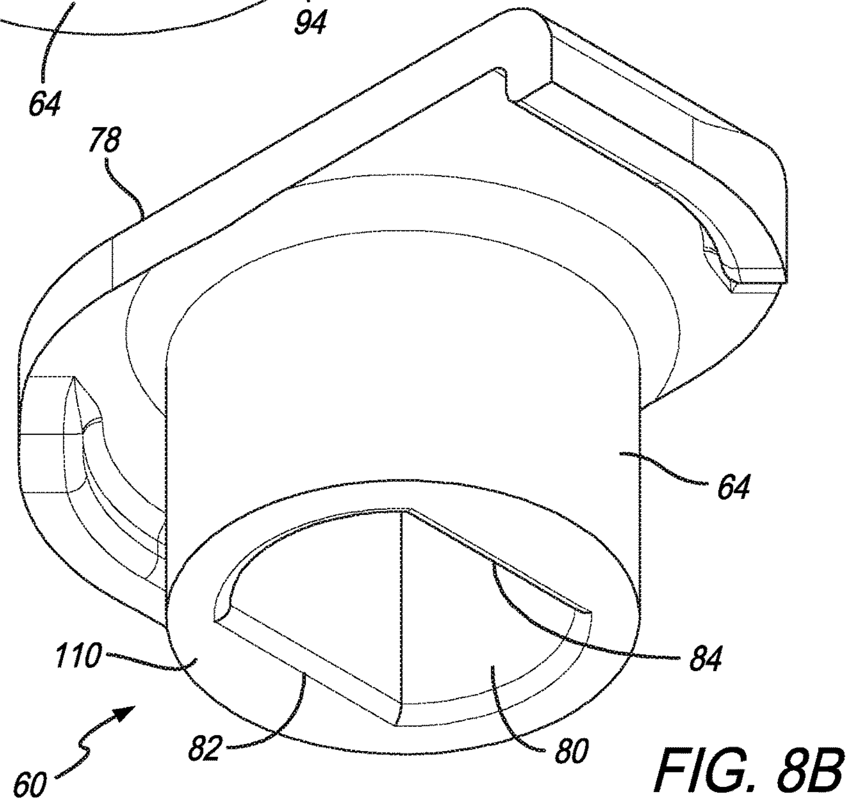

The underside perspective view of adapter 60, shown in FIG. 8B, also illustrates similar structures such as wing 78 and body 64. With respect to bore 80, this view also shows linear walls 82 and 84 disposed through an otherwise curved or cylindrical bore. Having these linear walls creates a key-type profile that can prevent a structure located inside (in this case cable tensioner 76) from rotating. Even more particular, having curved surfaces along with the linear surfaces as shown, allows structures like cable tensioner 76 to likewise have a partially curved body sufficient to accommodate a rotating structure such as nut 62 to be rotated thereon.

Further shown in this view is end surface 110 configured to abut against nut 62. This abutment allows nut 62 to remain stationary with respect to directions 68 and 70 while allowing cable tensioner 76 to move in direction 68 and 70 as its threads are moving through threaded bore 106 of nut 62. As discussed with respect to FIG. 5, this allows tension in the attached cable to be increased or decreased as needed by rotating nut 62 in one direction or the other.

Figure 8C:
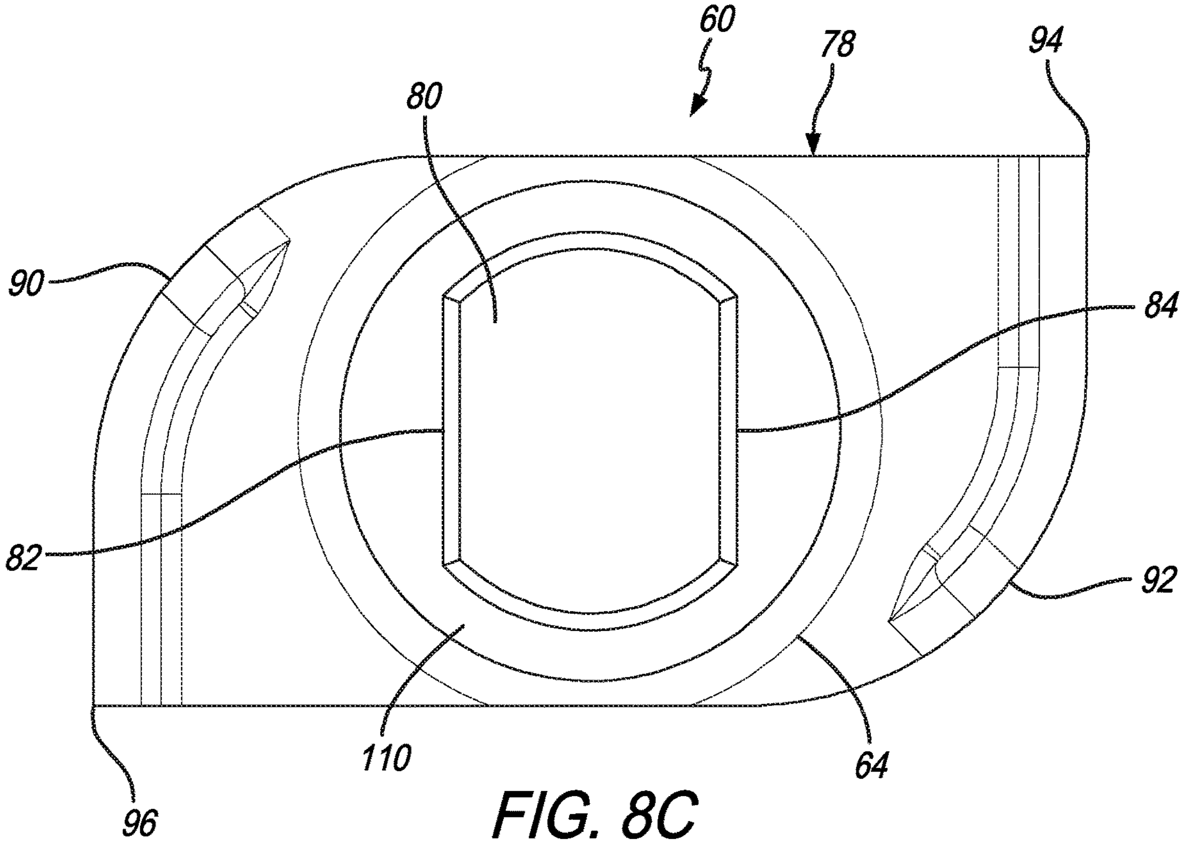
Figure 8D:
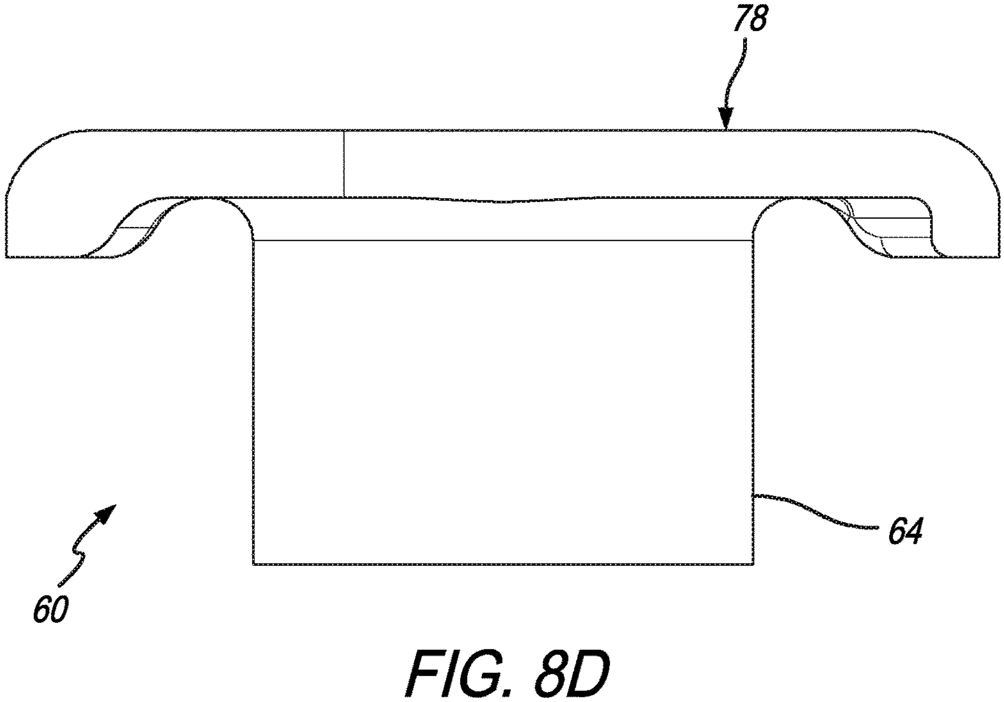

The underside view of adapter 60, shown in FIG. 8C, further depicts the previously discussed structures including body 64, wing 78, bore 80, radiused corners 90 and 92, and square corners 94 and 96. This view also shows the keying configuration of bore 80 using linear walls 82 and 84. Lastly, the side view in FIG. 8D shows the positioning of wing 78 with respect to body 64.

Figure 9:
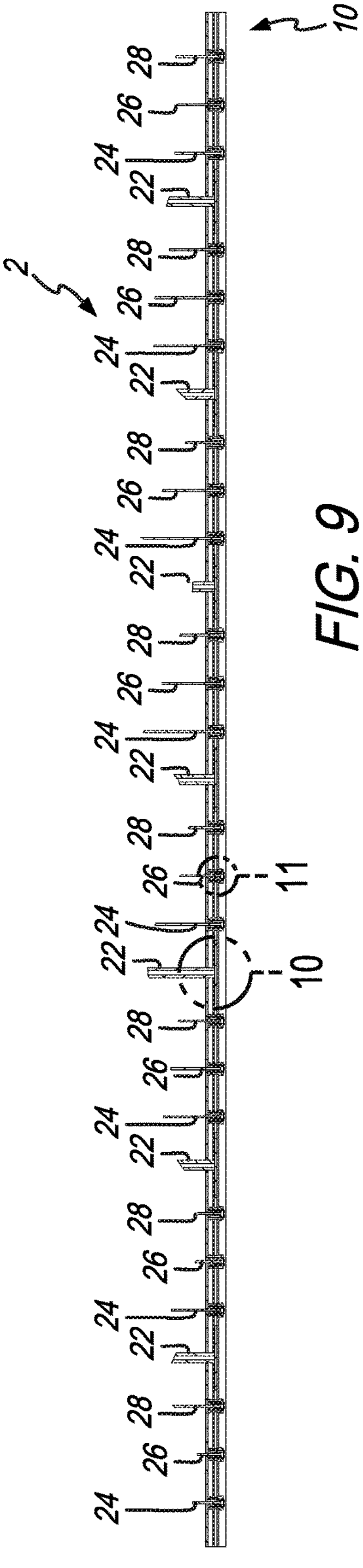
FIG. 9 is a side cross-sectional view of the lower rail area of the railing system.

A side cross-sectional view of the lower rail 10 area of railing system 2 is shown in FIG. 9. It is appreciated from this view how multiple cables such as illustrative cables 24, 26, and 28 may serve as balusters on railing system 2. Also, support baluster 22 may be placed in an alternating arrangement with the illustrative cable balusters as shown. Again, it is appreciated that any number of cable balusters or support balusters may be employed on a section of railing system 2 based on a desired need.

Figure 10:
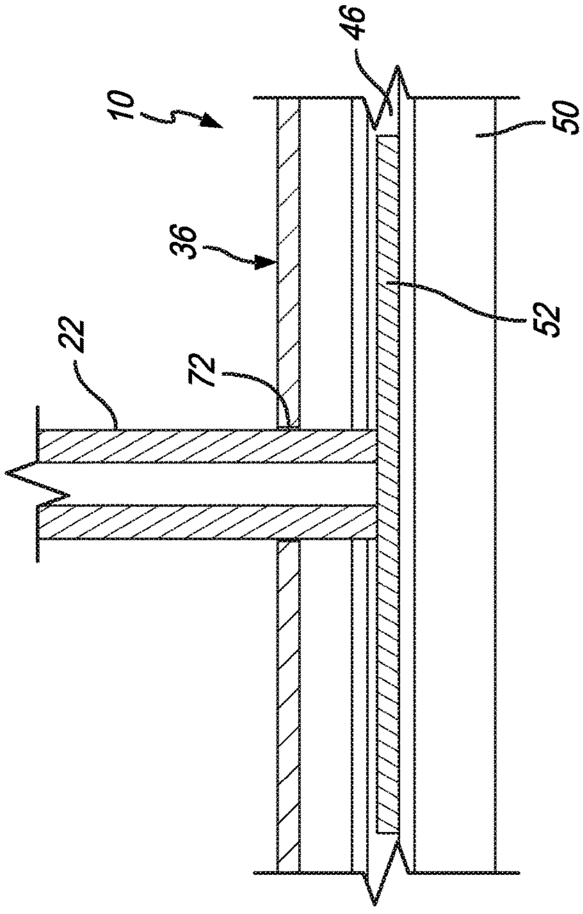
FIG. 10 is a detail cross-sectional view of a portion of the lower rail with a support baluster disposed therein.

A detail cross-sectional view of a portion of lower rail 10, with support baluster 22 disposed therein from FIG. 9, is shown in FIG. 10. Here, as previously discussed, support baluster 22 is disposed through opening 72 in top panel 36 of lower rail 10. It engages bar 52, which is shown located in slot 46 of sidewall 40.

Figure 11:
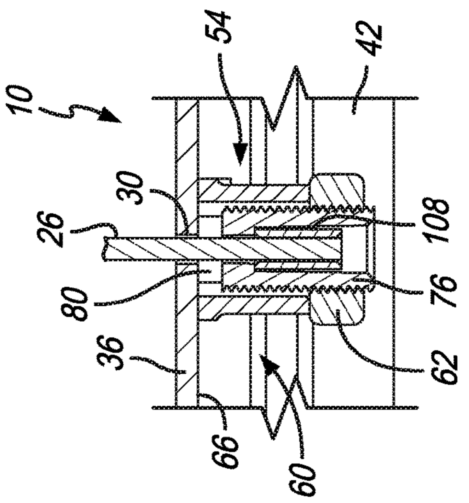
FIG. 11 is another side cross-sectional view of a securement assembly.

A side cross-sectional view of securement assembly 54, located in space 42 within lower rail 10, taken from FIG. 9, is shown in FIG. 11. Here, it is further appreciated how cable 24 extends through opening 30 of top panel 36 of lower rail 10. Adapter 60 abuts up against inner surface 66 of top panel 36 and via cable stop sleeve 108 fitted in cable tensioner 76, which itself is located in bore 80 of adapter 60 and is held in place and secured by nut 62, as shown and previously discussed.

Figure 12:
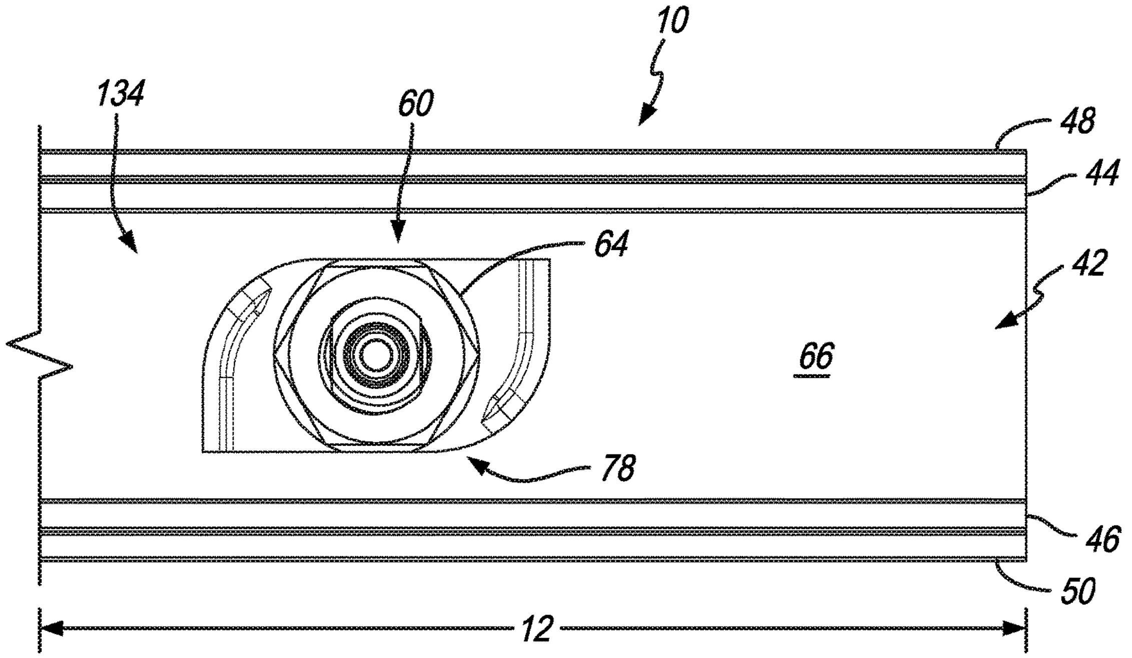
FIG. 12 is an underside view of a portion of the lower rail.
Figure 13:
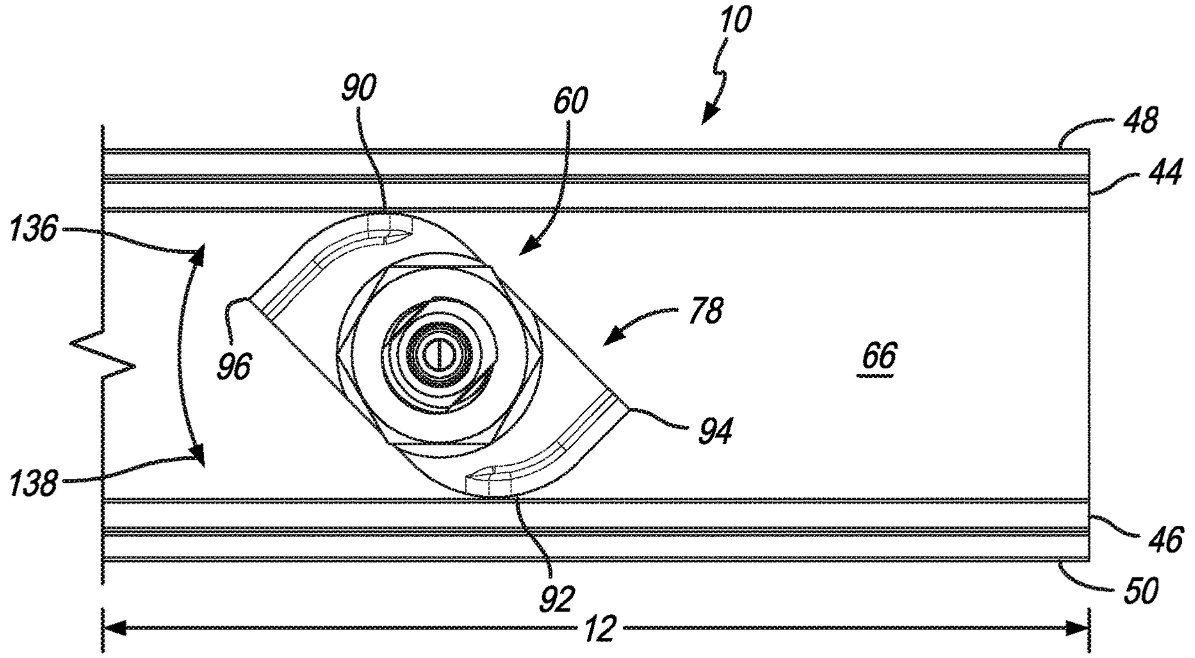
FIG. 13 is another underside view of a portion of the lower rail.
Figure 14:
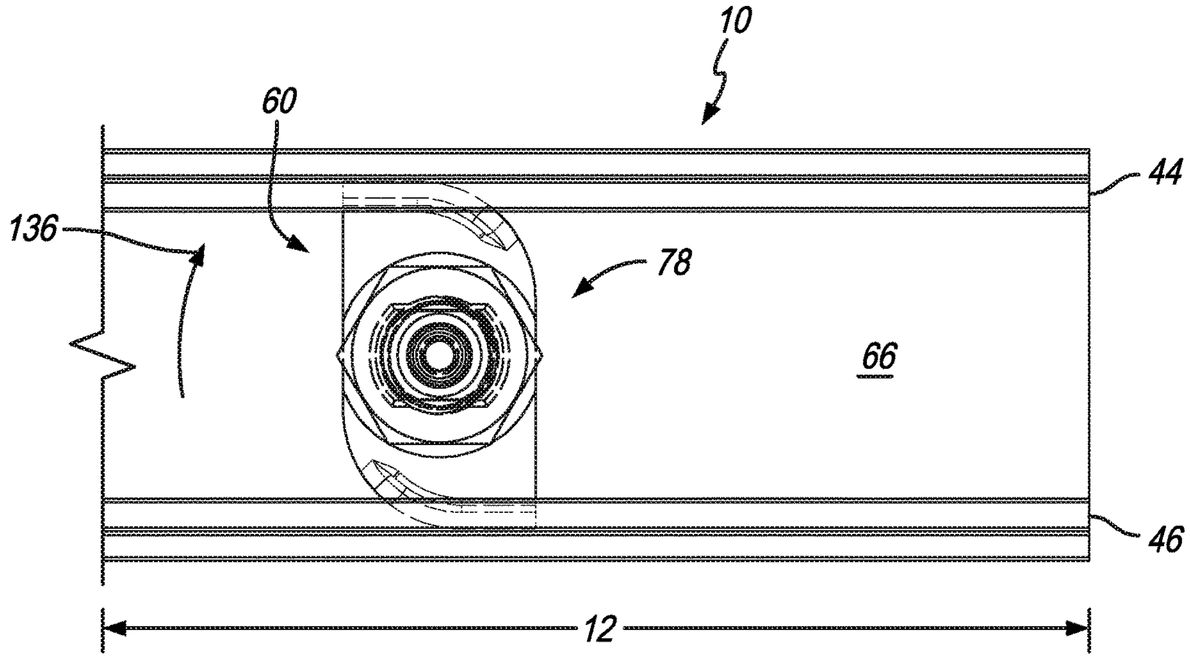
FIG. 14 is another underside view of the portion of the lower rail.

Underside views of a portion of lower rail 10 are shown in FIGS. 12, 13, and 14. These views depict the progression of how adapter 60 is positioned within space 42 of lower rail 10 and moved to its final installation position. As shown in FIG. 12, wing 78 of adapter 60 is longitudinally oriented along or parallel with run 12 within lower rail 10, as shown. Because slots 44 and 46 extend inward of space 42 from inner surfaces 48 and 50, it may not be practical to construct an adapter that can be disposed directly into space 42 through bottom opening 134 of lower rail 10. When assembling a rail system such as railing system 2, the method of assembly can be an issue. Placing adapters onto inner surface 66 of lower rail 10 can be achieved, but holding them there can be an issue in light of slots 44 and 46. Accordingly, wing 78 is longitudinally extended so that adapter 60 is narrow enough to fit into space 42 without slots 44 and 46 becoming obstructions. Then, as shown in FIG. 13, adapter 60 may be rotated in direction 136 to begin orienting adapter 60 transverse of run 12 of lower rail 10.

As shown in FIG. 13, wing 78, which is rotatable in either direction 136 or 138, has the longitudinal extent sufficient to move unobstructively under slots 44 and 46. Radiused corners 90 and 92 become useful in allowing the corners of wing portion 78 to move adjacent to sidewalls 38 and 40 because there is no square corner at those locations. As particularly shown in FIG. 14, wing 78 is now located perpendicular to the longitudinal extent of lower rail 10 with the leading edge of the wings positioned under slots 44 and 46. In essence, adapter 60 has been rotated in direction 136, about one-quarter turn, so wing 78 is positioned adjacent if not abutting sidewalls 38 and 40 of lower rail 10. This allows more convenient positioning and holding of adapter 60 over its corresponding opening in top panel 36 of lower rail 10 during the installation process. From that, the cable nut, and the cable tensioner may all be secured.

Figure 15:
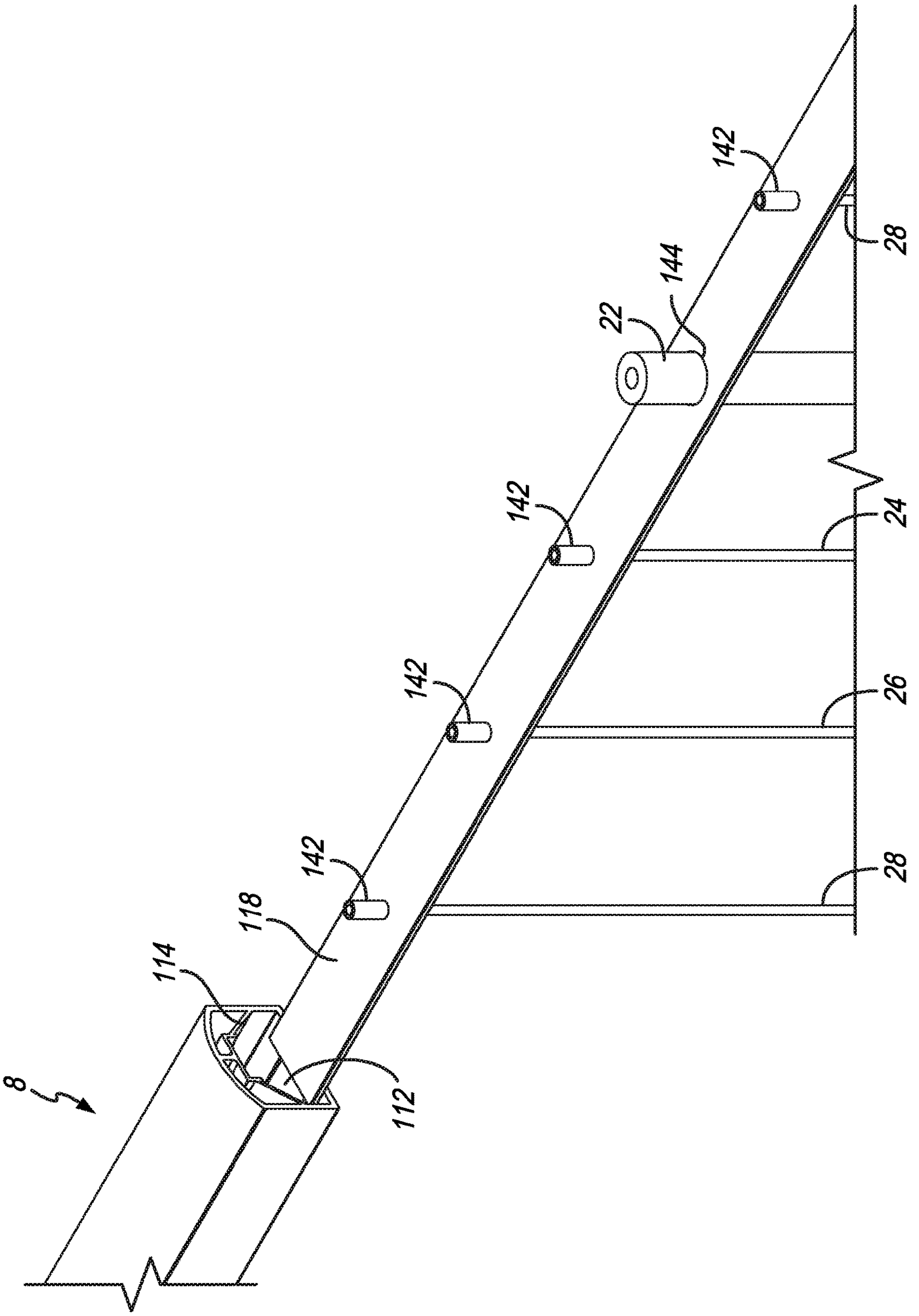
FIG. 15 is a perspective view of the upper rail with a longitudinally-extending retainer.

A perspective view of upper rail 8, with longitudinally extending retainer 118 separated therefrom, is shown in FIG. 15. This view shows how support cap 114 may illustratively be configured in upper rail 8, along with opening 112. It is appreciated that upper rail 8 may be extruded so that both support cap 114 and opening 112 may be formed therein via extrusion. With particular regard to opening 112, it may be longitudinally extending by virtue of its formation through extruding upper rail 8. This means that individual through holes do not need to be formed in upper rail 8. Instead, such holes may be disposed in longitudinally extending retainer 118 which, illustratively shown, is a flat panel. Disposing such holes in a flat panel such as longitudinally extending retainer 118 provides a simpler manufacturing process than disposing them through the more complex structure like upper rail 8. As shown herein, cables 24, 26, and 28 are each illustratively extended through longitudinally extending retainer 118 and held in place by a swage 142. It is appreciated that each cable may extend into a swage 142 and be crimped thereon or by other mechanical means to securely fasten the cable to swage 142.

Also shown in this view is support baluster 22 extending through opening 144 so as to engage support cap 114 as shown in FIG. 4. By this arrangement, the skilled artisan, upon reading this disclosure, will appreciate that cables 24, 26, and 28 (or any combination thereof), along with support baluster 22, may be assembled onto longitudinally extending retainer 118 prior to longitudinally extending retainer 118 being assembled with upper rail 8. This allows the majority of the assembly to take place without interference from upper rail 8. Once that assembly is completed, upper rail 8 may be slid onto longitudinally extending retainer 118 to finish the upper-portion of the assembly process for railing system 2. This process enables engagement of the rigid support balusters into the bottom rail and up through the top bar insert after the both cable ends have been swaged onto each cable.

Another illustrative embodiment of the present disclosure is directed to a stair railing system that employs a plurality of tensioned cables that are spaced apart and extended between parallel-spaced, but angularly (i.e., non-horizontally the oriented), upper and lower rails. Like the prior embodiments, however, each of the plurality of cables extends from the underside of the top rail to the bottom rail to serve as balusters for the stair railing system. Also, as a support baluster extends from upper and lower stair rails, the support baluster is rigid to assist defining spacing between the upper and lower stair rails in similar fashion to that described with respect to the prior embodiments, but here configured to be used on a staircase.

Figure 16:
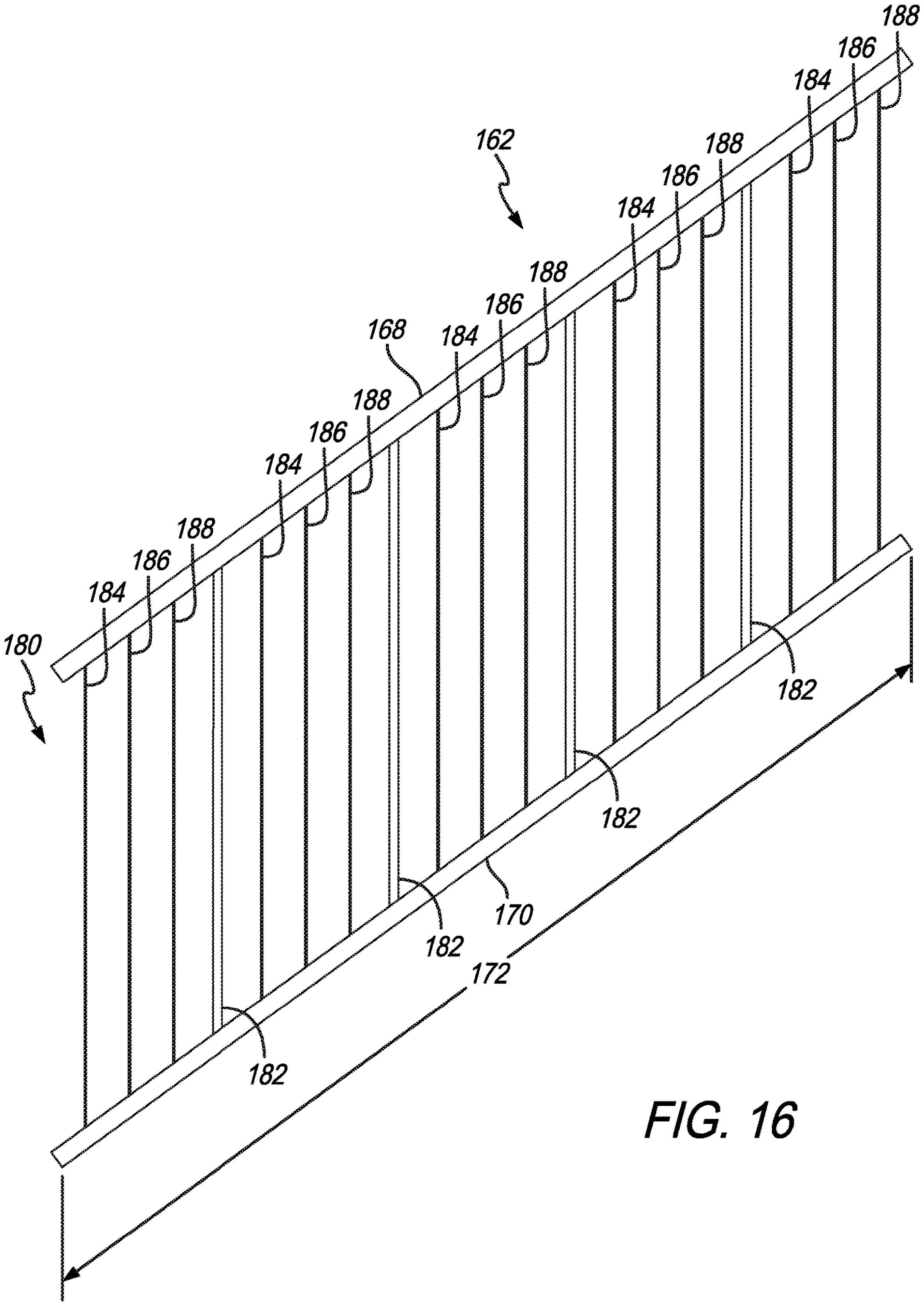
FIG. 16 is a side view of an illustrative embodiment of a staircase rail system.

A side view of an illustrative embodiment of a staircase rail system 162 is shown in FIG. 16. Staircase rail system 162 includes an upper rail 168 and lower rail 170 like rails 8 and 10 of railing system 2. Upper and lower rails 168 and 170 help define the distance or run 172 of staircase rail system 162. It is appreciated that multiple staircase rail systems 162 may be connected together to extend the length of a full staircase. Extending between upper and lower rails 168 and 170, respectively, is an illustrative plurality of support balusters 182 which defines the distance that will form space 180 between upper rail 168 and lower rail 170. It is appreciated that, like the prior embodiments, any number of support balusters 182 may be used to create a staircase rail system 162 of desired run 172. For example, only one support baluster 182 may be used under circumstances when run 172 is relatively short. In contrast, two, four or six support balusters 182 may be employed when run 172 is relatively long. Accordingly, the skilled artisan, upon reading the present disclosure, will appreciate that the number of support balusters 182 shown herein are illustrative only and does not limit the scope of the disclosure. Furthermore, support balusters 182 may be made from metal, including, but not limited to, aluminum, iron, steel, etc., or wood, plastic, vinyl, or other like rigid material.

Also extending between upper and lower railings 168 and 170, respectively, in space 180, are a plurality of cables 184, 186, and 188. Like support balusters 182, it is appreciated that any number of cables from one to three to twenty to any other number may be employed in a section of staircase rail system 162. In the illustrative embodiment, the set of three cables 184, 186, and 188 are located adjacent and between support balusters 182. Further, the illustrative embodiment in FIG. 16 is not intended to define a specific number of such cables. Like the prior embodiments, it is further appreciated that these cables may be made of any variety of materials, including, but not limited to, stainless steel, other metal, nylon, fabric, or natural material. Illustratively, each of cables 184, 186, and 188 exert a tension force against upper and lower rails 168 and 170, respectively. This counteracts the support balusters 182 which resists that tension force to maintain the space 180 between rails 168 and 170. The result is a strong staircase rail system 162 with aesthetic uniqueness derived from the cables to provide a corresponding look that complements railing system 2. Cables 184, 186, and 188 act as balusters in similar fashion to cables 24, 26, and 28 of rail system 2. The baluster function also serves as a barrier in space 180 between rails 168 and 170.

Figure 17:
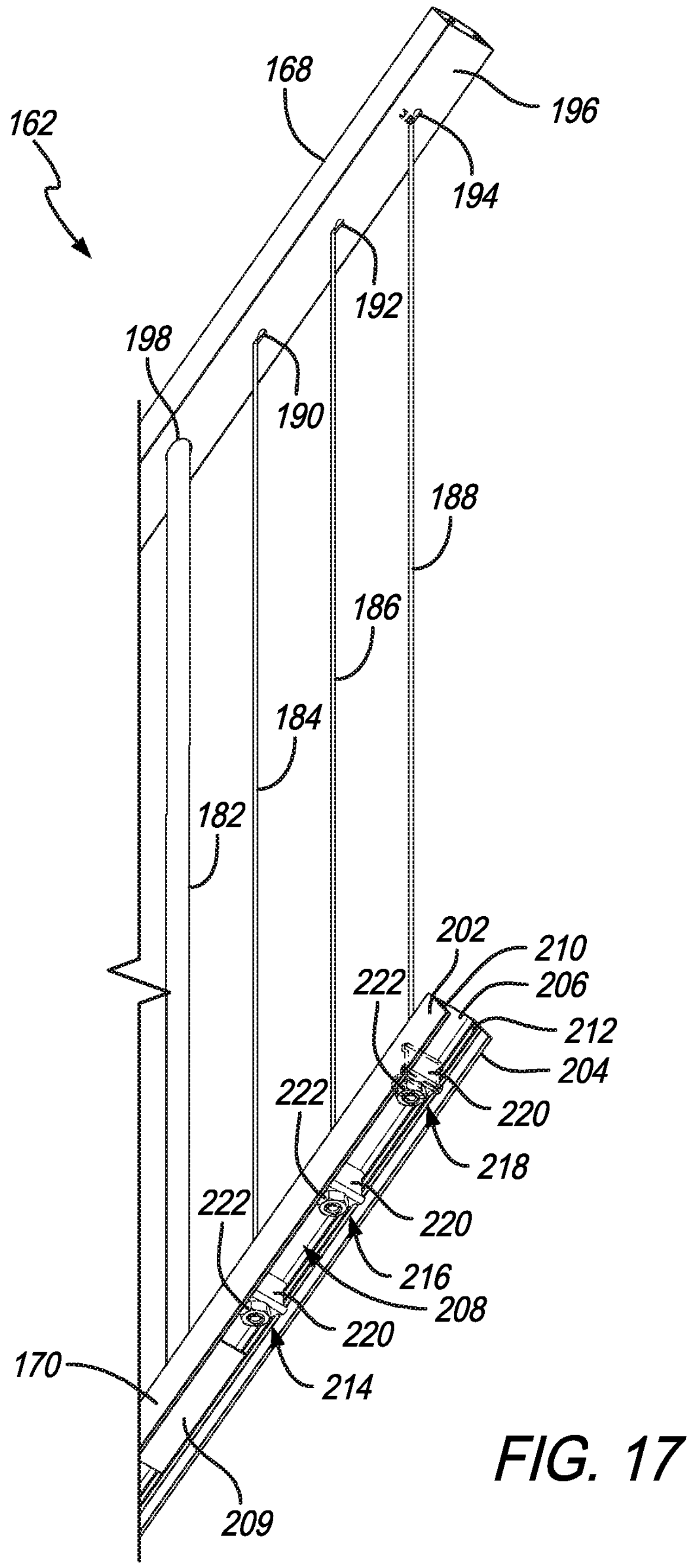
FIG. 17 is a detail perspective view of the underside of a portion of a section of the staircase rail system.

A detail perspective view of the underside of a portion of a section of staircase rail system 162 is shown in FIG. 17. This view depicts how cables 184, 186, and 188 each attach to upper rail 168 and lower rail 170. With regard to attaching to upper rail 168, illustrative keyholes 190, 192, and 194 are disposed through a bottom panel 196 of upper rail 168 as illustratively shown. In the illustrated embodiment, each of keyholes 190, 192, and 194 are key-shaped, meaning that the keyhole is made up of a relatively large opening portion adjacent a narrow slotted portion. As will be demonstrated further herein, this key shape is to assist in assembling staircase rail system 162. Illustratively, the cable with a retainer attached thereto may be inserted into the larger opening portion and then slid so the cable is moved to the slotted portion. Because the slot is narrower, the retainer cannot be removed, so it and the cable are held into place in upper rail 168, as shown in FIG. 17. Also shown in this view is support baluster 182 that extends through opening 198 disposed through bottom panel 196 of upper rail 168.

This detail view of FIG. 17 also depicts how cables 184, 186, and 188 attach to lower rail 170. Openings disposed through lower rail 170 (see, also, FIG. 19), similar to that described with respect to the prior embodiments, allow each of cables 184, 186, and 188 to be disposed into lower low rail 170. Sidewalls 202 and 204, of lower rail 170, depend from top panel 206 and form a space within the underside of lower rail 170. Like the prior embodiments, it is appreciated that lower rail 170 (as well as upper rail 168), may be made of extruded aluminum, steel, iron, plastic, or other like materials suitable for railing construction. In the illustrated embodiment, each of the sidewalls 202 and 204 include opposing slots 210 and 212 similar to slots 44 and 46 of the prior embodiment. These sidewalls 202 and 204, along with top panel 206 and slots 210 and 212, extend along the longitudinal extent or run 172 (see FIG. 16), similar to the prior embodiments. Slots 210 and 212, similar to slots 44 and 46, are configured and sized to receive bar 209, which supports support balusters 182, similar to how slots 44 and 46 receive bar 52 to support baluster 22, as shown in FIGS. 4 and 6 of the prior embodiments.

To secure each of cables 184, 186, and 188 to lower rail 170, each include securement assemblies 214, 216, and 218 similar to securement assemblies 54, 56, and 58 of the prior embodiments. In this case, however, securement assemblies 214, 216, and 218 each includes an adapter bracket 220 that help secure the cable along with support nut 222, tensioner 224, and cable stop 226 (see, also, FIG. 19). Adapter bracket 220 is sized and dimensioned to fit into slots 210 and 212. Support nut 222 holds both tensioner 224 and cable stop 226 so that the cable will be oriented vertical with respect to a horizontal line 171 (see FIG. 19), even when upper and lower rails 168 and 170, respectively, are positioned at an angle with respect to horizontal line 171.

Figure 18:
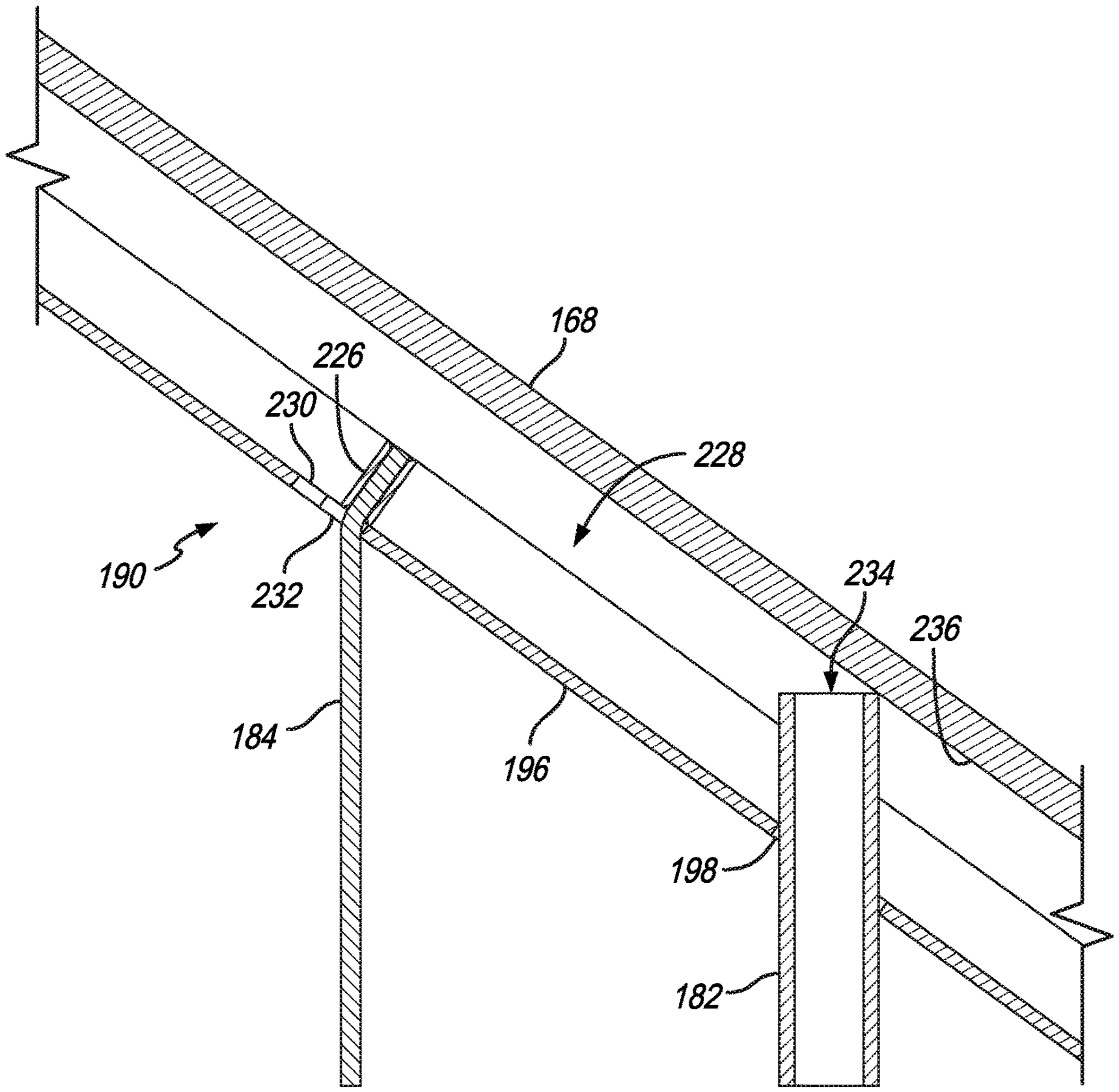
FIG. 18 is a side cross-sectional detail view of a portion of the upper rail.

A side cross-sectional detail view of a portion of upper rail 168 is shown in FIG. 18. This view depicts how cable 184 affixed to cable stop 226 may be fitted and held within a cavity 228 within upper rail 168. Illustratively, and as previously discussed, keyhole 190 is composed of a relatively larger opening 230 that is in communication with adjacent slot 232. It is appreciated that all of the additional keyholes 192, and 194 are configured the same way. Again, any number of cables may be used as desired for staircase rail system 162.

As demonstrated in FIG. 18, cable stop 226 which holds the end of cable 184, may be disposed through opening 230 to fit into cavity 228. Because of the angular orientation of upper rail 168, cable 184 may be slid into slot 232. Because slot 232 is narrower than opening 230, there is only enough space for cable 184 to be fitted therein. Cable stop 226, as shown herein, adds additional width to cable 184, an amount wider than the width of slot 232 (see, also, FIG. 17). This means cable stop 226 prevents cable 184 from being removable from upper rail 168 while in slot 232. This assists in a more convenient assembly of the cables to the upper rail portion of staircase rail system 162. Also shown in this view is support balusters 182 disposed through opening 198 in bottom panel 196 of upper rail 168. The inner surface of bottom panel 196 supports cable stop 226. Illustratively, end portion 234 of support balusters 182 may engage the inner surface 236 of upper rail 168 to provide a consistent upper stop surface for support balusters 182 to help provide a consistent distance indicated by space 180 (see FIG. 16) between upper and lower rails 168 and 170.

Figure 19:
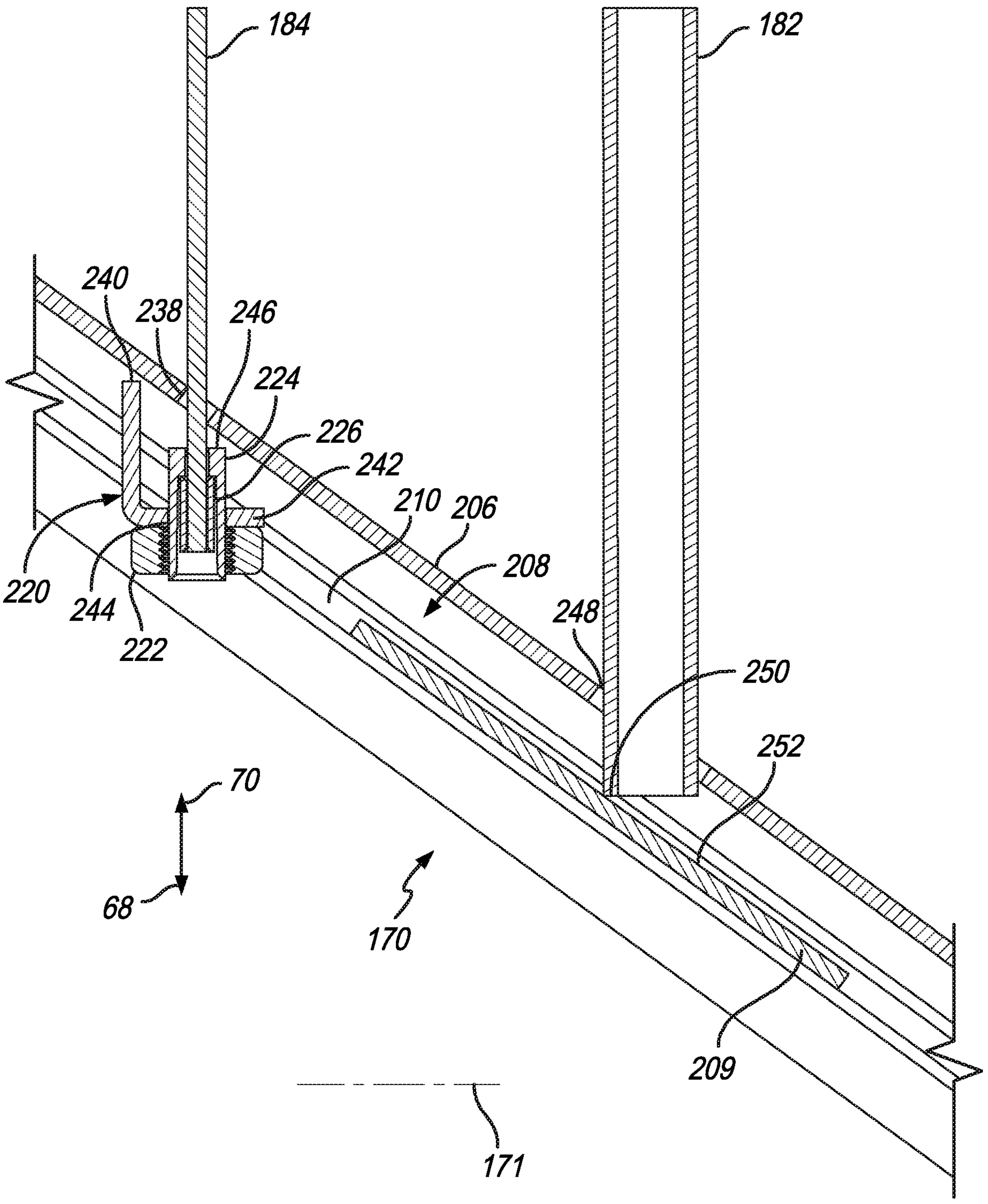
FIG. 19 is a detail cross-sectional view of the lower rail portion of the staircase rail system.

A side cross-sectional detail view of lower rail 170 is shown in FIG. 19. This view is a similar view to that shown in FIG. 18 except that only the bottom portion of staircase rail system 162 is being shown.

A detail cross-sectional side view of lower rail portion 170 of staircase rail system 162 is shown in FIG. 19. This view depicts how the cables, whether it be 184, 186, or 188, are secured to lower rail 170. Although cable 184 is shown herein, it will be appreciated by the skilled artisan that this applies to the other cables as well. In this illustrative embodiment, cable 184 is shown being disposed through opening 238, which itself is disposed through top panel 206 of lower rail 170. Cable 184 extends into space 208. Adapter bracket 220 is positioned onto slot 210 and includes a securement portion 240 and support base 242 so as to couple and secure to space 208 within lower rail 170. Extending transverse from securement portion 240 is support base 242, which is sized and oriented to support nut 222, as shown therein.

Furthermore, support base 242 includes an opening 244 through which tensioner 224 is disposed so as to engage support nut 222. It is appreciated that support base 242 may be angled at a sufficient orientation with respect to horizontal plane 171 to assist in ensuring its cable, such as cable 184, is oriented vertically with respect to horizontal plane 171. Further, it is appreciated that tensioner 224 may be configured similar to that shown with respect to tensioner 76 of the prior embodiments (see FIG. 5) to allow movement of same with its cable in either directions 68 or 70 to not only secure tensioner 224 to support nut 222, but also keep its cable such as cable 184 taught while in space 180 so the cable may serve as an effective baluster. This view also shows how cable stop 226, fitted about cable 184, seats within tensioner 224, similar to cable stop 108 fitted inside tensioner 76 of the prior embodiments. Here, cable 184 extends from bore 246 disposed through an illustrative portion of tensioner 224 as illustratively shown. With this configuration similar to the prior embodiments, cable 184 is free to extend through tensioner 224 while keeping the end portion of cable 184, via cable stop 226, inside tensioner 224. This means, support nut 222 is engageable with tensioner 224 and may be moved in directions 68 and 70 as desired to create the appropriate tension between the two structures. Further, shown in this view is support baluster 182 extended through opening 248 disposed through top panel 206 of lower rail 170. A bar 209 is fitted into slots 210 and 212 (see, also, FIG. 17) to serve as a support base for support baluster 182 that is disposed in space 208 of lower rail 170. As illustratively shown, a lower edge 250 is shown engaging top surface 252 of bar 209.

Figure 20:
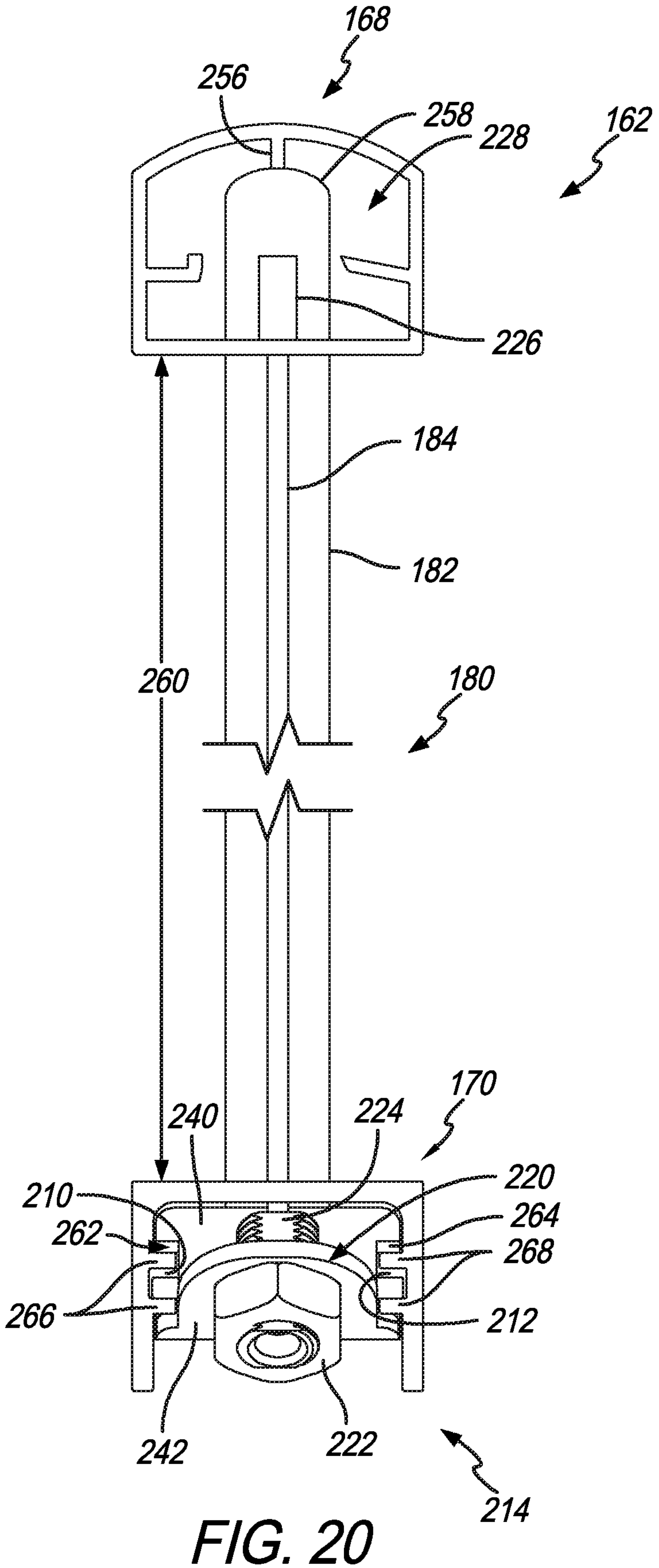
FIG. 20 is an end across-sectional view of the staircase rail system.

An end cross-sectional view of staircase rail system 162 is shown in FIG. 20. This view depicts support balusters 182 extended into cavity 228 of upper rail 168. Illustratively, a stop 256 engages top end 258 of support balusters 182 for purposes of defining the extent to which support balusters 182 extends into upper rail 168. Again, these structures, along with bar 209 and the engagement between support balusters 182, and same within lower rail 170, define the distance between upper and lower rails 168 and 170 as indicated by distance 260 which creates space 180. With this distance 260 defined, cables 184, 186, and 188, illustratively, can span that distance 260 in space 180 to serve as balusters for staircase rail system 162. As shown, cable stop 226 holds the end of cable 184 (the same is the case with the other cables as well), which is inserted into cavity 228 of upper rail 168 to secure cable 184, herein as previously explained with respect to FIGS. 17 and 18. With respect to lower rail 170, this view shows cable 184 extending into tensioner 224 disposed through adapter bracket 220 and secured thereon by support nut 222. This view also shows how securement portion 240 of adapter bracket 220 includes slots 262 and 264 that receive protrusions 266 and 268 that form slots 210 and 212, respectively. It is appreciated that protrusions 266 and 268 of this embodiment may be formed in any particular configuration including those that might not necessarily require slots 210 and 212. That said, this configuration allows standardization in manufacturing of the lower rail to be similar, if not the same, as that described with respect to lower rail 10 in the prior embodiments. Here, support base 242 and securement portion 240 of adapter bracket 220 serves as both a support base for the securement assemblies, such as securement assembly 214, illustratively shown in this view, but also as a wedging structure to assist holding adapter bracket 220 in place during assembly of staircase rail system 162. It is appreciated that securement assemblies 216 and 218 operate the same way and include the same structures as described herein with respect to securement assembly 214. The wedging effect of adapter bracket 220 enables tensioning of cables in securement assemblies 214, 216, and 218 while preventing an upward sliding movement of adapter bracket 220 along lower rail 170.

Figure 21A:
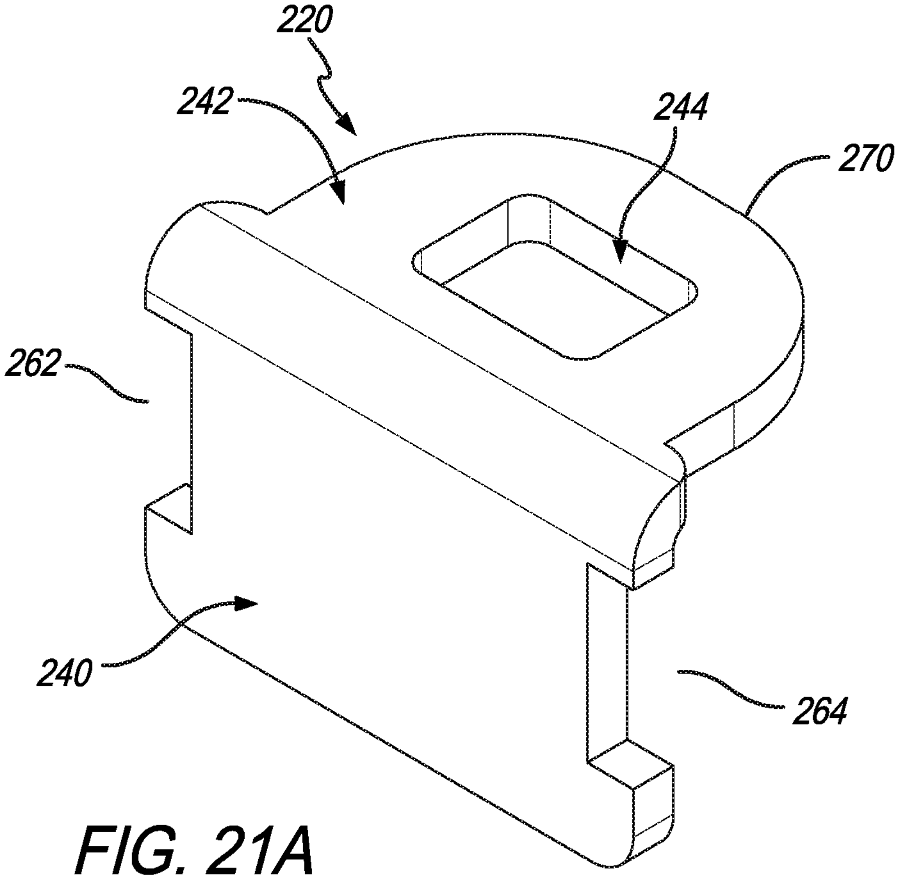
FIGS. 21A, 21B, 21C, and 21D are perspective, side, top, and rear views, respectively, of an adapter bracket.
Figure 21B:
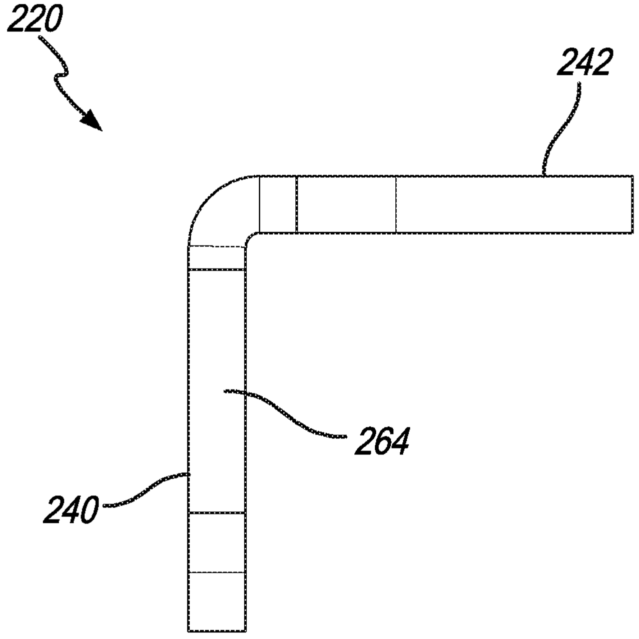

Various views of adapter bracket 220 are shown in FIGS. 21A, 21B, 21C, and 21D. The perspective view of adapter bracket 220, shown in FIG. 21A, illustrates opening 244 that receives tensioner 224 (see, also, FIG. 19). Opening 244 is disposed through support base 242 which is oriented generally transverse to securement portion 240. In the illustrated embodiment, support base 242 is illustratively oriented about perpendicular to securement portion 240. The peripheral edge 270 of support base 242 is illustratively rounded as shown herein so as to better position adapter bracket 220 into place within lower rail 170 (see, also, FIG. 23). Slots 262 and 264 are shown formed on the outer periphery of securement portion 240. Illustratively, slots 262 and 264 are positioned axially opposed to each other. They are dimensioned and sized to receive protrusions 266 and 268 that extend from sidewalls 202 and 204, respectively, in lower rail 170. Again, securement portion 240 accommodates the structures in lower rail 170 for ease of manufacture. In an illustrative embodiment, lower rail 170 may be similar or the same as lower rail 10 shown in the prior embodiments (see, also, FIG. 7). This means a special lower railing member does not need to be made. It is appreciated, however, that adapter bracket 220 may have a different configuration that may not require slots 262 or 264, or such slots may be configured differently so as to accommodate protrusions of different character based on the needs and manufacture of the lower rail.

Figure 21C:
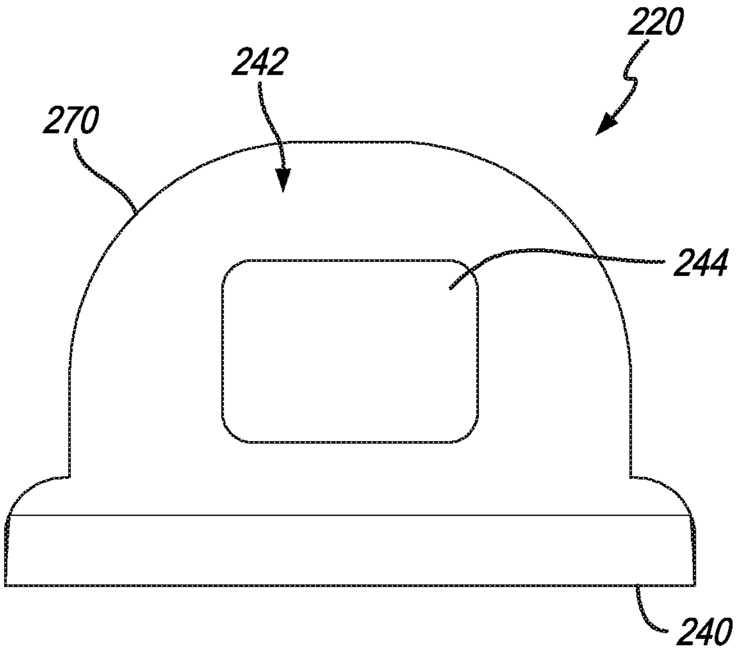
Figure 21D:
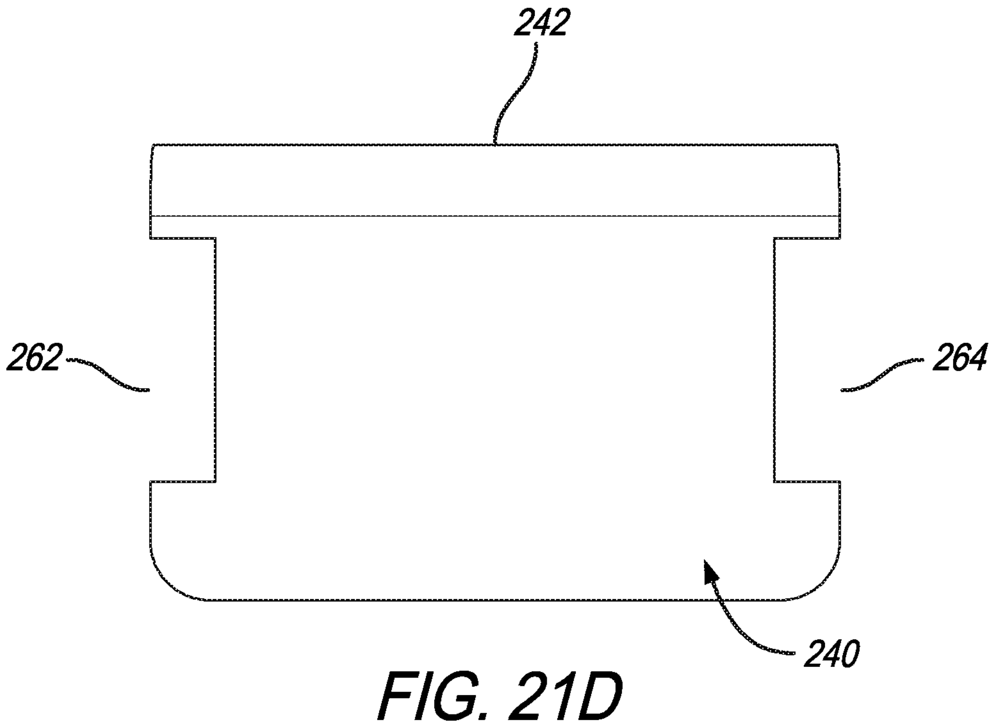

The side view of adapter bracket 220 shows the illustrative orientation of securement portion 240 with respect to support base 242. Herein, the orientation is about perpendicular. This view also shows the positioning of slots 264 (slot 262 will be in the same position, but on the other side of securement portion 240). It is appreciated that this positioning may be adjusted as needed depending on the configuration of the lower rail. The top view of adapter bracket 220 is shown in FIG. 21C. Here, the rounded character of peripheral edge 270 of support base 242 is evident. This is also the case with opening 244 disposed through support base 242. The rear view of adapter bracket 220 is shown in FIG. 21D. This view further shows securement portion 240 with slots 262 and 264 disposed therethrough.

Figure 22:
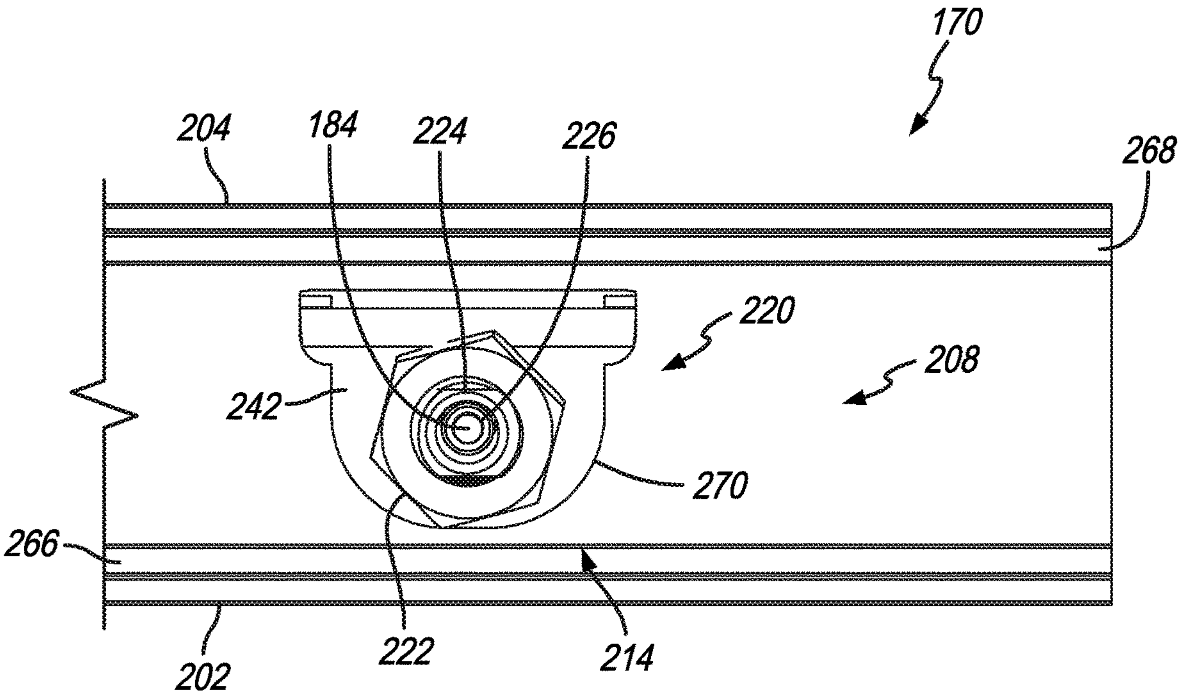
FIG. 22 is an underside view of a portion of the lower rail of the staircase rail system.
Figure 23:
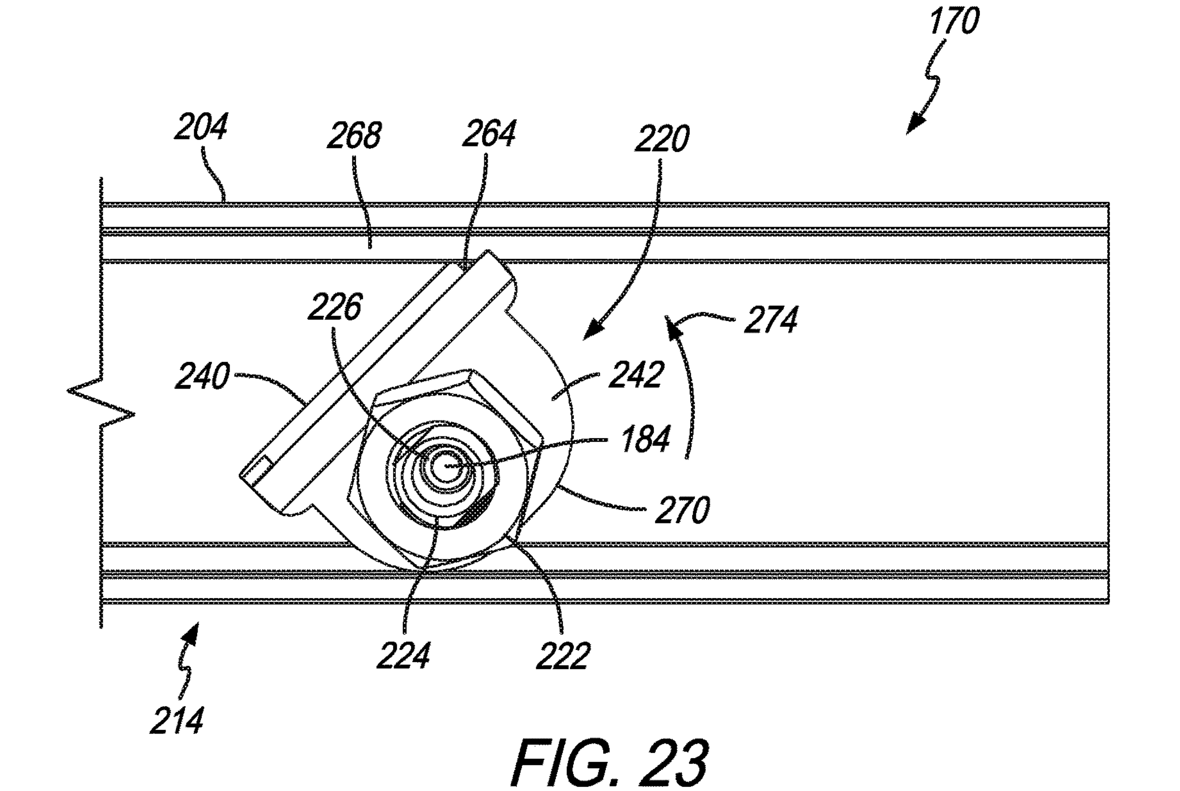
FIG. 23 is another underside view of a portion of the lower rail.
Figure 24:
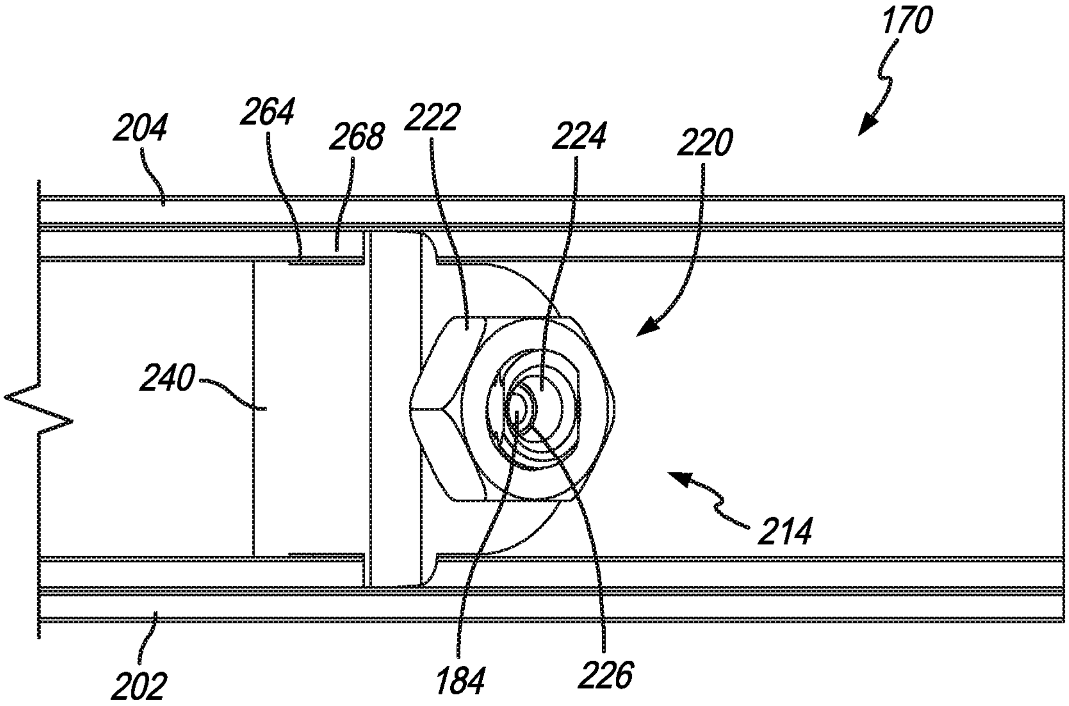
FIG. 24 is another underside view of the portion of the lower rail.

Underside views of a portion of lower rail 170 are shown in FIGS. 22, 23, and 24. These views, similar to FIGS. 12, 13, and 14 of the prior embodiments, depict the progression of how adapter bracket 220 is positioned within space 208 of lower rail 170 and moved to its final installation position. As shown in FIG. 22, adapter bracket 220 is positioned longitudinally as shown within space 208 of lower rail 170. Peripheral edge 270 is oriented facing one or the other of sidewalls 202 or 204. In this view, peripheral edge 270 of support base 242 faces sidewall 202. This view also shows protrusions 266 and 268 extending inward in space 208.

Furthermore, support nut 222 may engage tensioner 224, which holds stop 226 with cable 184. This may all be assembled with adapter bracket 220 oriented as shown in FIG. 22. This is to allow ease of assembly of securement assembly 214 without having adapter bracket 220 engaged or otherwise held by lower rail 170. All components of securement assembly 214 may be attached together prior to securement assembly 214 being positioned within space 208 of lower rail 170. Once this happens, all that is needed to secure securement assembly 214 to lower rail 170 is the process further described in FIGS. 23 and 24.

As shown in the underside view FIG. 23, adapter bracket 220 of securement assembly 214 may be rotated illustratively in direction 274 so that slot 264 will begin receiving protrusion 268 that extends from sidewall 204 of lower rail 170. Because of the curved edge configuration of peripheral edge 270 of support base 242, there is sufficient clearance for adapter bracket 220 to rotate as shown.

As depicted in the underside view of lower rail 170 in FIG. 24, securement portion 240 of adapter bracket 220 is rotated illustratively about 90° from its original orientation shown in FIG. 22. This causes both protrusions 266 and 268 to be fitted within slots 262 and 264, respectively. This position of adapter bracket 220, as shown herein, is about a 90° pivot of same from that shown in FIG. 22. In this position, protrusions 266 and 268 assist holding adapter bracket 220 in place. At this point, cable 184 may then be inserted into keyhole 190, as shown in FIG. 18. Support nut 222 of securement assembly 214 may then be rotated to move tensioner 224, which will pull on cable stop 226 and thus cable 184 to provide sufficient tension on same for it to be used as a baluster for staircase rail system 162.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features. It should also be appreciated that any subject matter disclosed in this non-provisional Patent Application that may differ from the priority Application, the disclosure from this non-provisional Patent Application controls.

What is claimed:

1. A cable railing comprising:

at least one longitudinally extending rail;

an adapter fitted within the at least one longitudinally extending rail;

wherein the adapter includes a body, a first wing member and a second wing member each of which extend outwardly from the body;

wherein the adapter is rotatable with respect to the at least one longitudinally extending rail until the first wing member and the second wing member engage the at least one longitudinally extending rail to stop rotation of the of the adapter;

a tensioner fitted within the body of the adapter; and a cable that extends through an opening disposed through the at least one longitudinally extending rail and disposed in the tensioner and the adapter;

wherein neither the tensioner nor the adapter extends through the opening disposed through the at least one longitudinally extending rail.

2. The cable railing of claim 1, wherein the cable includes a cable stop attached thereto, wherein the cable stop engages the tensioner fitted within the body of the adapter.

3. The cable railing of claim 2, further comprising a nut located adjacent the adapter wherein the nut is rotatable and continues to be rotatable on the tensioner which pulls the cable stop on the cable.

4. The cable railing of claim 3, wherein the tensioner includes at least one threaded surface on which the nut is threadable.

5. The cable railing of claim 2, wherein the cable stop engages a stop surface within the tensioner.

6. The cable railing of claim 2, wherein the cable stop and end of the cable are fitted inside the tensioner, and wherein the tensioner includes at least a partially threaded outer body.

7. The cable railing of claim 6, further comprising a nut that is rotatable onto corresponding threads of the tensioner such that the tensioner pulls on the cable stop and the cable to tension the cable.

8. The cable railing of claim 1, wherein the tensioner is not rotatable when the adapter the first wing member and the second wing member engage the at least one longitudinally extending rail.

9. The cable railing of claim 1, wherein the adapter includes a bore that extends through the body, and wherein the bore receives the tensioner.

10. The cable railing of claim 1, wherein the at least one longitudinally extending rail includes a lower rail.

11. The cable railing of claim 1, wherein the at least one longitudinally extending rail includes a lower rail and an upper rail, and wherein the adapter is fitted within the lower rail.

12. The cable railing of claim 1, wherein the adapter is rotatable between a first position and a second position, and wherein the second position is about perpendicular from the first position.

13. The cable railing of claim 1, further comprising a plurality of adapters, wherein each adapter of the plurality of adapters is fitted within the at least one longitudinally extending rail, wherein the each adapter of the plurality of adapters includes a body a first wing member and a second wing member each of which extend outwardly from the body, wherein the each adapter of the plurality of adapters is rotatable with respect to the at least one longitudinally extending rail until the first wing member and the second wing member engage the at least one longitudinally extending rail to stop rotation of the of the each adapter of the plurality of adapters, a plurality of tensioners, wherein each of the tensioners of the plurality of tensioners is fitted within the body of the each adapter of the plurality of adapters, and a plurality of cables, wherein each cable of the plurality of cables extends through a corresponding opening disposed through the at least one longitudinally extending rail, wherein neither the each tensioner of the plurality of tensioners nor the each adapter of the plurality of adapters extends through the corresponding opening disposed through the at least one longitudinally extending rail.

14. A cable railing comprising:

at least one longitudinally extending rail;

an adapter fitted within the at least one longitudinally extending rail;

wherein the adapter includes a body, a first wing member and a second wing member each of which extend outwardly from the body; and wherein the adapter is rotatable until at least the first wing member engages the at least one longitudinally extending rail to stop rotation of the of the adapter.

15. The cable railing of claim 14, further comprising a tensioner fitted within the body of the adapter.

16. The cable railing of claim 15, wherein neither the tensioner nor the adapter extends through the opening disposed through the at least one longitudinally extending rail.

17. The cable railing of claim 14, further comprising a cable that extends through an opening disposed through the at least one longitudinally extending rail and into the adapter.

18. A cable railing comprising: at least one longitudinally extending rail; an adapter fitted within the at least one longitudinally extending rail; a tensioner fitted within the adapter; and a cable that extends through an opening disposed through the at least one longitudinally extending rail; wherein neither the tensioner nor the adapter extends through the opening disposed through the at least one longitudinally extending rail, wherein the adapter includes a body a first wing member and a second wing member each of which extend outwardly from the body, and wherein the adapter is rotatable with respect to the at least one longitudinally extending rail until at least the first wing member engages the at least one longitudinally extending rail to stop rotation of the of the adapter.

* * * * *